(12) United States Patent
Wong et al.

(10) Patent No.: US 11,751,132 B2
(45) Date of Patent: *Sep. 5, 2023

(54) WAKE-UP SIGNAL CANDIDATE INDICATOR

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/966,069

(22) PCT Filed: Feb. 8, 2019

(86) PCT No.: PCT/EP2019/053180
§ 371 (c)(1),
(2) Date: Jul. 30, 2020

(87) PCT Pub. No.: WO2019/158446
PCT Pub. Date: Aug. 22, 2019

(65) Prior Publication Data
US 2021/0352581 A1 Nov. 11, 2021

(30) Foreign Application Priority Data
Feb. 15, 2018 (EP) ..................................... 18157017

(51) Int. Cl.
*H04W 52/02* (2009.01)
*H04J 13/00* (2011.01)
(Continued)

(52) U.S. Cl.
CPC ..... *H04W 52/0212* (2013.01); *H04J 13/0029* (2013.01); *H04J 13/0062* (2013.01);
(Continued)

(58) Field of Classification Search
None
See application file for complete search history.

(56) References Cited

U.S. PATENT DOCUMENTS

2012/0275364 A1* 11/2012 Anderson ......... H04W 52/0222
370/311
2016/0066255 A1* 3/2016 Marinier ............... H04W 48/16
370/350
(Continued)

FOREIGN PATENT DOCUMENTS

EP 2621242 A 7/2013
WO 2017/162813 A1 9/2017
(Continued)

OTHER PUBLICATIONS

Liu, U.S. Appl. No. 62/585,478, filed Nov. 13, 2017 (Year: 2017).*
(Continued)

*Primary Examiner* — Jay L Vogel
(74) *Attorney, Agent, or Firm* — XSENSUS LLP

(57) ABSTRACT

A wake-up signal being for providing an indication to one or more flood of the communications devices that they should receive a paging message in one or more of a plurality of temporally spaced paging occasions, and transmitting a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

19 Claims, 9 Drawing Sheets

(51) Int. Cl.
   *H04W 68/00* (2009.01)
   *H04W 68/02* (2009.01)
   *H04W 72/23* (2023.01)
   *H04W 72/0446* (2023.01)

(52) U.S. Cl.
   CPC ..... *H04W 52/0235* (2013.01); *H04W 68/005* (2013.01); *H04W 68/025* (2013.01); *H04W 72/0446* (2013.01); *H04W 72/23* (2023.01); *Y02D 30/70* (2020.08)

(56) References Cited

U.S. PATENT DOCUMENTS

| | | | | |
|---|---|---|---|---|
| 2018/0270756 | A1* | 9/2018 | Bhattad | H04W 76/27 |
| 2018/0279274 | A1* | 9/2018 | Sun | H04L 1/1864 |
| 2018/0332533 | A1* | 11/2018 | Bhattad | H04W 52/0216 |
| 2019/0090193 | A1* | 3/2019 | Liu | H04W 52/028 |
| 2019/0150114 | A1* | 5/2019 | Liu | H04W 68/025 370/252 |
| 2019/0253100 | A1* | 8/2019 | Liu | H04W 72/02 |
| 2020/0029302 | A1* | 1/2020 | Cox | H04W 68/02 |
| 2020/0204292 | A1* | 6/2020 | Jiang | H04L 1/0038 |
| 2021/0007053 | A1* | 1/2021 | Jiang | H04W 52/028 |
| 2021/0058909 | A1* | 2/2021 | Wong | H04W 68/025 |
| 2021/0136687 | A1* | 5/2021 | Liu | H04W 72/0446 |
| 2021/0212122 | A1* | 7/2021 | Cho | H04W 74/00 |
| 2021/0227466 | A1* | 7/2021 | Kim | H04W 68/005 |
| 2021/0250903 | A1* | 8/2021 | Sharma | H04W 68/025 |
| 2021/0266866 | A1* | 8/2021 | Basu Mallick | H04W 48/12 |

FOREIGN PATENT DOCUMENTS

| | | |
|---|---|---|
| WO | 2018/202693 A1 | 11/2018 |
| WO | 2018/202718 A1 | 11/2018 |
| WO | 2018/202751 A1 | 11/2018 |
| WO | 2019/030337 A1 | 2/2019 |
| WO | 2019/063479 A1 | 4/2019 |
| WO | 2019/096704 A1 | 5/2019 |
| WO | 2019/096855 A1 | 5/2019 |

OTHER PUBLICATIONS

Kim U.S. Appl. No. 62/630,285, filed Feb. 14, 2018 (Year: 2018).*
Liu, U.S. Appl. No. 62/628,776, filed Feb. 9, 2018 (Year: 2018).*
International Search Report and Written Opinion dated May 13, 2019 for PCT/EP2019/053180 filed on Feb. 8, 2019, 9 pages.
Holma, H., and Toskala, A., "System Architecture Based on 3GPP SAE," LTE for UMTS: OFDMA and SC-FDMA Based Radio Access, John Wiley & Sons, Ltd., Apr. 2009, pp. 25-27.
Ericsson and Qualcomm, "New WID on Even further enhanced MTC for LTE," 3GPP TSG RAN Meeting No. 75, RP-170732, revision of RP-170465, Dubrovnik, Croatia, Mar. 6-9, 2017, 4 pages.
Ericsson, "Assumptions for eMTC power consumption for power saving signal/channel," 3GPP TSG-RAN WG1 Meeting No. 91, R1-1714992, Prague, Czech Republic, Aug. 21-25, 2017, 8 pages.
Ericsson, "Downlink channel power efficiency for MTC," 3GPP TSG-RAN WG1 Meeting No. 91, R1-1719351, Reno, Nevada, USA, Nov. 27-Dec. 1, 2017, pp. 1-12.
Ericsson, "Reduced system acquisition time for MTC," 3GPP TSG-RAN WG1 Meeting No. 90bis, R1-1716995, Prague, Czech Republic, Oct. 9-13, 2017, pp. 1-7.
Ericsson, "Revised WID for Further Enhanced MTC for LTE," 3GPP TSG RAN Meeting No. 73, RP-161464, revision of RP-161321, New Orleans, USA, Sep. 19-22, 2016, 6 pages.
Hambeck, C., et al., "A 2.4μW Wake-up Receiver for Wireless Sensor Nodes with—71dBm Sensitivity," IEEE Proceedings of International Symposium of Circuits and Systems (ISCAS), IEEE, 2011, pp. 534-537.
Huawei and Hisilicon, "Revised work item proposal: Enhancements of NB-IoT," 3GPP TSG RAN Meeting No. 73, RP-161901, revision of RP-161324, New Orleans, USA, Sep. 19-22, 2016, 8 pages.
Huawei, et al., "New WID on Further NB-IoT enhancements," 3GPP TSG RAN Meeting No. 75, RP-170852, Dubrovnik, Croatia, Mar. 6-9, 2017, 6 pages.
Sierra Wireless, "Idle Mode Power Efficiency Reduction," 3GPP TSG RAN WG1 Meeting No. 89, R1-1708311, Hangzhou, P.R. China, May 15-19, 2017, 6 pages.
Sierra Wireless et al., "Coverage Analysis of LTE-M Category-M1," White Paper, Version 1.0, Jan. 2017, pp. 1-20.

* cited by examiner

WAKE-UP SIGNAL CANDIDATE INDICATOR

CROSS-REFERENCE TO RELATED APPLICATIONS

The present application is based on PCT filing PCT/EP2019/053180, filed Feb. 8, 2019, which claims priority to EP 18157017.7, filed Feb. 15, 2018, the entire contents of each are incorporated herein by reference.

BACKGROUND

Field of Disclosure

The present disclosure relates to infrastructure equipment and communications devices of wireless communications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of communications devices associated with different traffic profiles gives rise to new challenges for efficiently handling communications in wireless telecommunications systems that need to be addressed, particularly, but not exclusively, in respect of low power devices.

SUMMARY OF THE DISCLOSURE

The present disclosure can help address or mitigate at least some of the issues discussed above as defined in the appended claims.

Embodiments of the present technique can provide a method of operating an infrastructure equipment in a wireless communications system. The wireless communications system comprises the infrastructure equipment forming part of a wireless communications network and a plurality of communications devices, wherein the method comprises providing a wireless access interface for communication between the infrastructure equipment and the communications devices, allocating a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and transmitting a candidate indicator message to the one or more communications devices in advance of the wake-up signal search space, the candidate indicator message indicating one or more characteristics of the wake-up signal by which the wake-up signal is able to be transmitted as one or more candidates, wherein the one or more candidates are to be searched for detection of the wake-up signal by the one or more communication devices.

In one arrangement, the one or more characteristics of the wake-up signal comprises a repetition level at which the wake-up signal can be transmitted as the one or more candidates to be searched for detection of the wake-up signal by the one or more communications devices within the search space, each of the repetition levels defining a number of times N which the wake-up signal can be transmitted, the number N being an integer including one to a maximum number Nmax, wherein the method comprises determining that a paging message should be transmitted to one or more of the communications devices in one or more of the plurality of temporally spaced paging occasions following the search space, if it is determined that the paging message should be transmitted to one or more of the communication devices, transmitting the wake-up signal in the search space in accordance with one of the one or more repetition levels indicated in the candidate indicator message, and transmitting the paging message in one or more of the plurality of temporally spaced paging occasions following the search space.

In order to provide an arrangement by which a remotely located communications device can detect a wake-up signal (WUS) the WUS is transmitted by infrastructure equipment repeatedly. The communications device can combine the WUS to improve a likelihood of detection. The number of repetitions can vary depending on the location of the communications device. In order to provide an arrangement in which the number of times the WUS is transmitted can vary, a search space is provided, within which communications devices can search for candidates of repeatedly transmitted WUS. However, the communications device can waste power and degrade the reliability of WUS detection in searching for candidates of the WUS transmitted with all of the possible different numbers of repetitions. Accordingly by transmitting a candidate indicator message to the communications devices before the search space, which candidate indicator message indicates one or more of the number of repetitions which may be used to transmit the WUS, following which the infrastructure equipment transmits the WUS with one of those repetitions levels, the communications device can reduce power consumption in detecting and does not degrade the reliability of detection of the WUS.

Embodiments of the present technique, which also relate to wireless communications systems, communications devices, methods for infrastructure equipment, wireless communications systems and communications devices, and circuitry for infrastructure equipment, wireless communications systems and communications devices, can provide arrangements in which a candidate indicator message can be transmitted to indicate one or more sets of possible repetitions of a downlink message, where the downlink message provides an indication to the communications device of which paging occasions it should monitor. Accordingly, embodiments of the present technique allow communications devices to receive information from infrastructure equipment which can allow the communications devices to save power by not unnecessarily monitoring for paging or downlink messages where there are none, whilst this information is itself received in a robust and power efficient manner.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
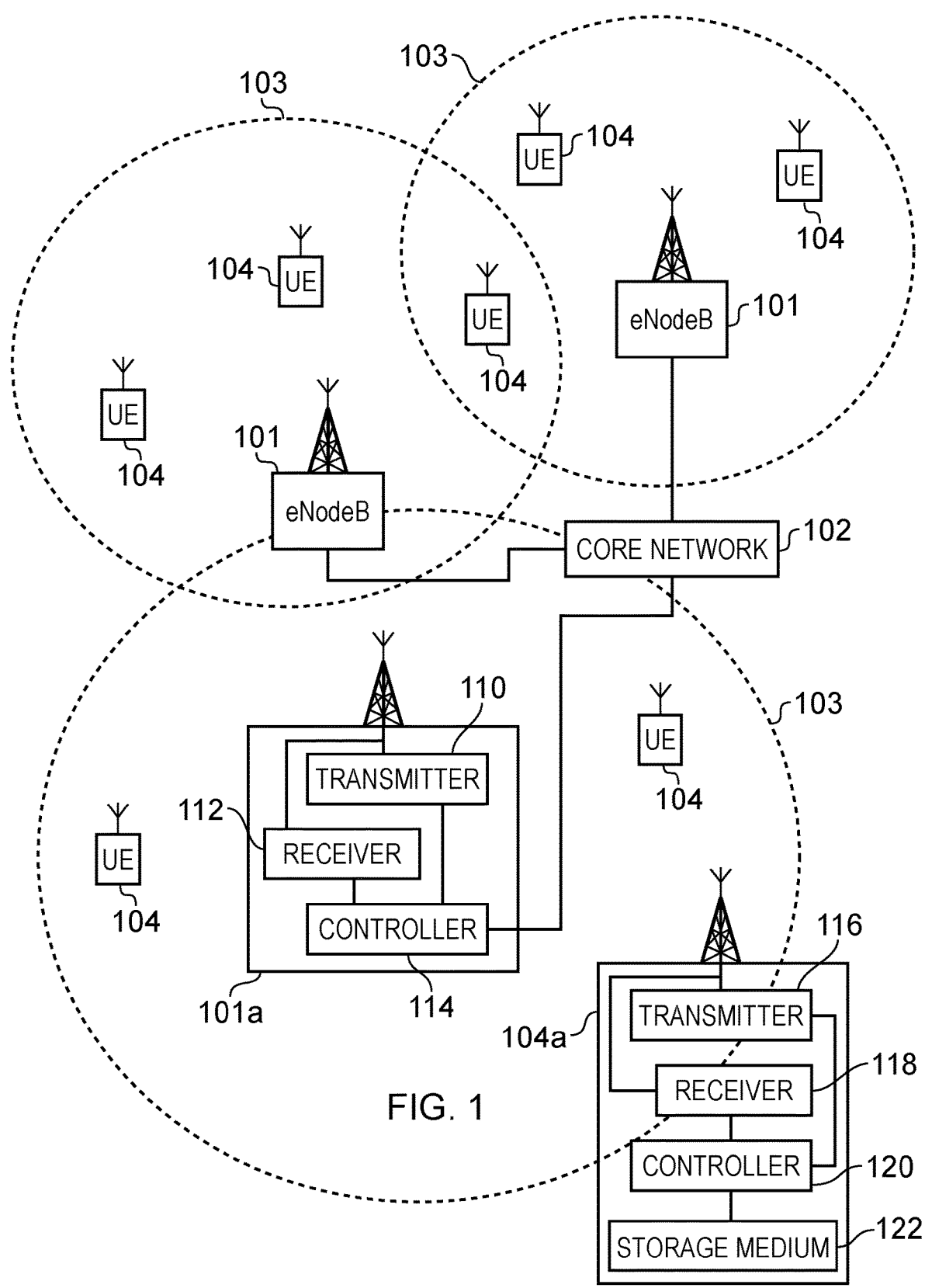
FIG. 1 schematically represents some aspects of a LTE-type wireless telecommunication system which may be configured to operate in accordance with certain embodiments of the present disclosure.

Long Term Evolution (LTE) Wireless Communications System FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP™ body, and also described in many books on the subject, for example, Holma H. and Toskala A [5]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB/eNB), a general Node B (gNodeB/gNB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface.

The core network 102 may also provide functionality including authentication, mobility management, charging and so on for the communications devices served by the network entity. The mobile communications devices of FIG. 1 may also be referred to as communications terminals, user equipment (UEs), communications devices, terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) or 5G/New Radio (NR) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

In this example, the infrastructure equipment 101a comprises a transmitter 110 for transmission of wireless signals, a receiver 112 for reception of wireless signals and a controller 114 configured to control infrastructure equipment 1001a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 114 may provide the scheduling function for the base station.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The UE 104a also comprises a storage medium 122, such as a solid state memory or similar, for storing data. The transmitter 116, receiver 118 and storage medium 122 are controlled by a controller 120. In the embodiments of the present disclosure, the UE 104a is a communications device configured to operate using feMTC (Further Enhanced Machine Type Communications) or eNB-IoT (Enhanced Narrowband Internet of Things). The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the communications device 104a will in general comprise various other elements associated with its operating functionality, for example a power source, user interface, and so forth, but these are not shown in FIG. 1 in the interests of simplicity.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIG. 2.

Figure 2:
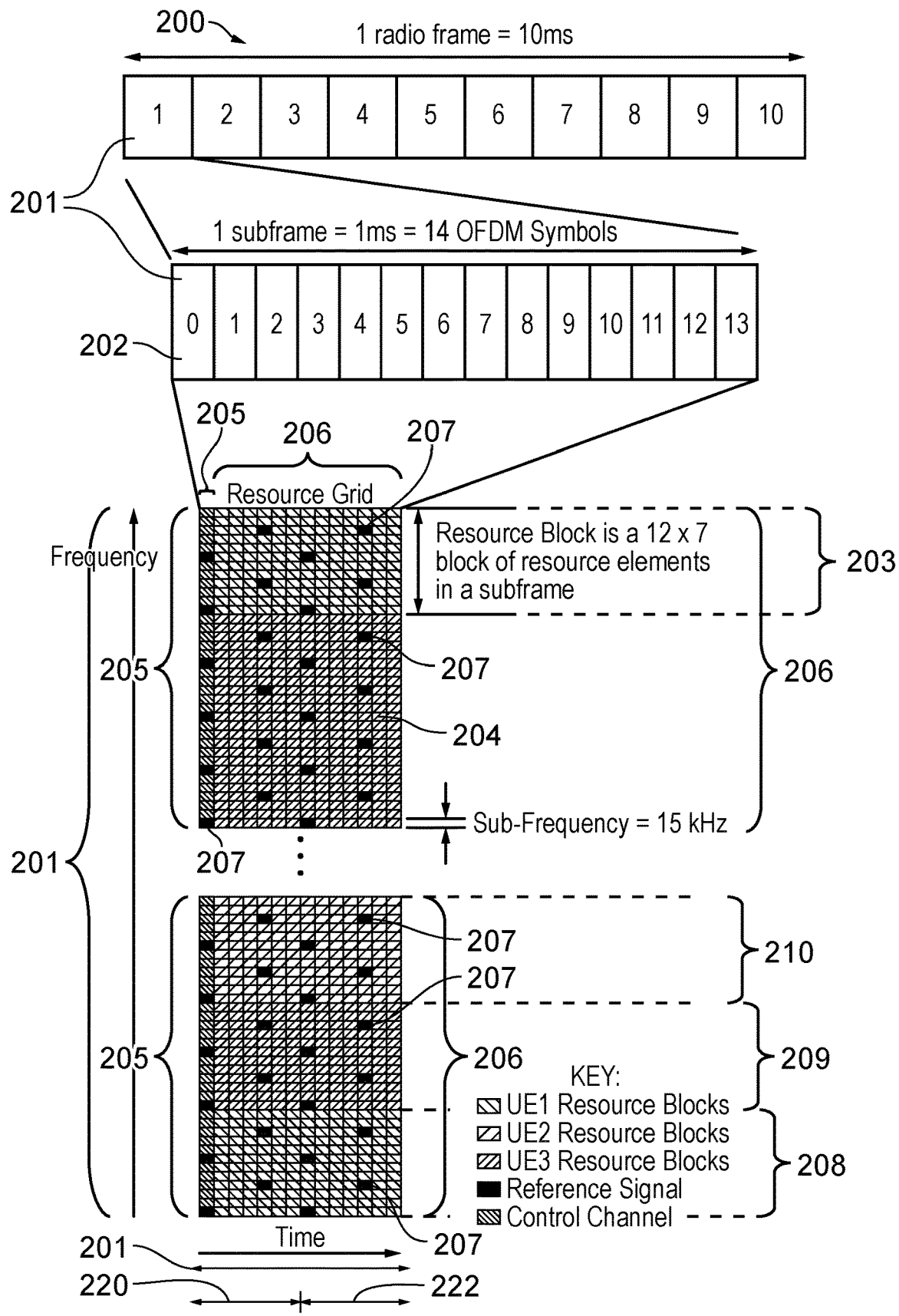
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data. The number of subcarriers varies between 72 subcarriers (1.4 MHz) and 1200 subcarriers (20 MHz). In some examples the subcarriers are grouped to form a scheduling blocks. A resource block (RB) can consist of 12 sub-carriers. A narrowband in MTC can consist of 6 RBs or 72 subcarriers. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The frame structure also contains primary synchronisation signals (PSS) and secondary synchronisation signals (SSS): not shown in FIG. 2. The PSS occupies the central 62 subcarriers of the $7^{th}$ OFDM symbol of the first subframe and the $7^{th}$ OFDM symbol of the $6^{th}$ subframe of the radio frame. The SSS occupies the central 62 subcarriers of the $6^{th}$ OFDM symbol of the first subframe and the central 62 subcarriers of the $6^{th}$ OFDM symbol of the $6^{th}$ subframe of the radio frame.

Before a terminal can use a cell provided by a base station, the terminal is expected to carry out a series of steps. For example, a terminal may be in a situation where it has not yet achieved synchronisation after a long DRX period or after having being switched on. A terminal would be expected to detect the cell and cell-ID using the Primary Synchronisation Signal (PSS) and Secondary Synchronisation Signal (SSS), and then receive the System Information (MIB) from the Physical Broadcast Channel (PBCH) and further System Information from the PDSCH. More specifically a terminal would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1-BR that is transmitted via the PDSCH. SIB1-BR contains scheduling information for acquiring the remaining System Information portions (other SIBs).

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Machine Type Communications (MTC)

One application of MTC is to provide periodic reports, e.g. sensors, utility meters, where the reports or readings are transmitted infrequently, e.g. once every several hours or days. Hence in order to save battery power, such devices likely operate mostly in idle mode where they operate with long DRX cycles. When a MTC UE is put into long DRX it will lose synchronisation with the network and hence upon waking up from DRX (e.g. to monitor the Paging Occasion or perform a RACH), the UE needs to re-synchronise to the network and perform system acquisition (read the MIB and SIB). In the legacy system, the UE uses the legacy LTE PSS (Primary Synchronization Signal) and SSS (Secondary Synchronization Signal) to achieve synchronisation and thereafter, the UE acquires the PBCH and then SIB1-BR. For a UE operating in coverage enhanced mode, these re-synchronisation and system acquisition operations are notoriously slow as numerous repetitions are required to be able to decode the PBCH and PDSCH channels carrying the System Information. Example estimates of the expected acquisition times for the PSS/SSS, PBCH (MIB) and SIB1 are shown in Table 1, which is reproduced from [6], for a deep coverage scenario.

TABLE 1

Estimated 90% acquisition time at 164 dB MCL (maximum coupling loss)

| Channel | 90% Acquisition Time (ms) at 164 dB MCL |
|---|---|
| PSS/SSS | 850 |
| PBCH (MIB) | 250 |
| PDSCH (SIB1-BR) | 750 |

Figure 3:
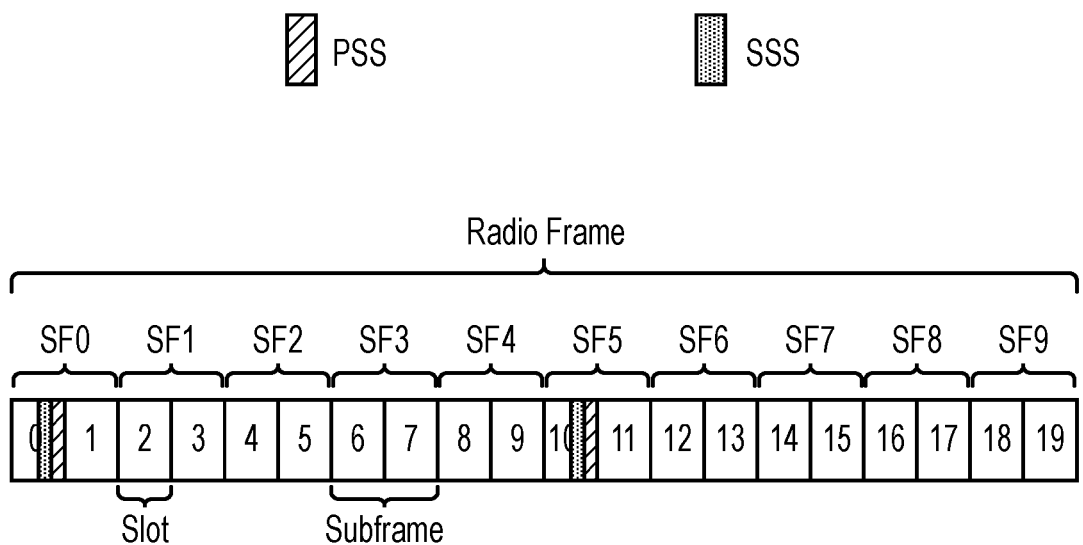
FIG. 3 schematically represents the transmission of the synchronisation signals in an FDD LTE system.

Legacy terminals (MTC terminals or otherwise) use the existing PSS/SSS which occupy only 1 OFDM symbol each and are transmitted sparsely; twice every radio frame. This is illustrated in FIG. 3 which represents the transmission of the synchronisation signals in an FDD LTE system, where it can be seen that the PSS and SSS each occupy a single OFDM symbol every 5 ms, where a radio frame is 10 ms. Here the PSS is transmitted in the last OFDM symbol of Slot 0 (Subframe 0) and Slot 10 (Subframe 5) whilst the SSS is transmitted in the second to last OFDM symbol of Slot 0 (Subframe 0) and Slot 10 (Subframe 5). Hence, additional synchronisation signals for MTC (MSS) are proposed for efeMTC to increase the density of available synchronisation signals so that the MTC UE can use them to shorten its time to re-synchronise to the network.

Figure 4:
FIG. 4 illustrates an example of how additional MTC synchronisation signals (MSS) can be intermittently transmitted.
Figure 4:
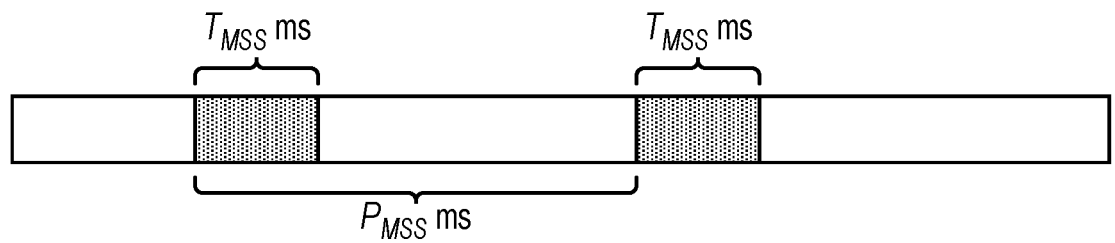

The MSS can be transmitted in a burst-like manner, i.e. it is transmitted densely for $T_{MSS}$ ms every $P_{MSS}$ ms [7], for example $T_{MSS}$ can be 10 to 20 ms and $P_{MSS}$ can be 100 ms to 3 seconds. The burst interval $T_{MSS}$ and periodicity $P_{MSS}$ is configurable thereby allowing the eNodeB to control the percentage of resources used for MSS. This is shown in FIG. 4.

Figure 5:
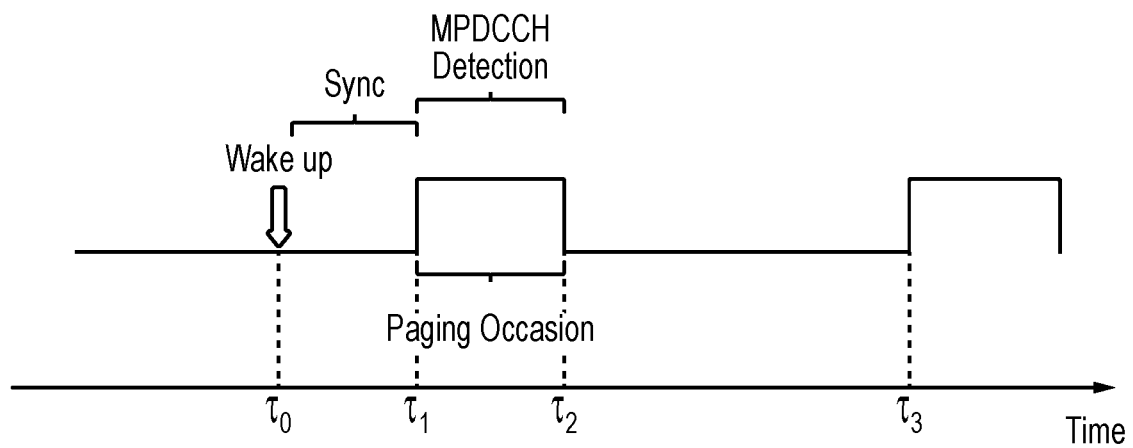
FIG. 5 provides a graphical illustration of a timing diagram representing a timing for transmitting a wake up signal before a paging occasion according to a previously proposed arrangement.

In previously proposed 3GPP systems, such as Rel-14 feMTC and Rel-14 eNB-IoT, the UE performs DRX in idle mode where the UE is required to monitor for possible paging messages at every Paging Occasion (PO). FIG. 5 shows a paging occasion cycle where the paging occasion starts at time $\tau_1$ and the UE is expected to blind detect for any potential MPDCCH (i.e. MPDCCH with a P-RNTI) between time $\tau_1$ and $\tau_2$. Typically the UE needs to wake up prior to the paging occasion, i.e. at time $\tau_0$ to perform synchronisation especially after a very long DRX where the UE loses synchronisation (where synchronisation can include fine adjustment to frequency and time tracking loops using CRS for when DRX cycles are short to re-synchronisation using PSS/SSS and CRS when DRX cycles are long and the frequency and timing of the UE is significantly offset relative to that of the eNodeB). If there is a paging message indication in the MPDCCH, the UE will decode the PDSCH carrying this paging message after time $\tau_2$. However, if there is no paging message indication in the MPDCCH for the UE, then the UE will go back to sleep until the next paging occasion at time $\tau_3$. It can be observed that if there is no paging message indication in the MPDCCH, the UE uses up a lot of energy waking up prior to the paging occasion and performing blind detection of MPDCCH. It is expected that paging does not occur very often for MTC devices and rarely (e.g. once a day) for utility meters and hence a lot of energy will be wasted performing unnecessary blind MPDCCH detections and overhearing paging messages that belong to other UEs.

As is well understood, various wireless telecommunications networks, such as the LTE-based network represented in FIG. 1 and the NR-based networks, may support different Radio Resource Control (RRC) modes for communications devices, typically including: (i) RRC idle mode (RRC_IDLE); and (ii) RRC connected mode (RRC_CONNECTED). When a communications device transmits data, RRC connected mode is generally used. The RRC idle mode, on the other hand, is for communications devices which are registered to the network (EMM-REGISTERED), but not currently in active communication (ECM-IDLE). Thus, generally speaking, in RRC connected mode a communications device is connected to a radio network access node (e.g. an LTE base station) in the sense of being able to exchange user plane data with the radio network access node. Conversely, in RRC idle mode a communications device is not connected to a radio network access node in the sense of not being able to communicate user plane data using the radio network access node. In idle mode the communications device may still receive some communications from base stations, for example reference signalling for cell reselection purposes and other broadcast signalling. The RRC connection setup procedure of going from RRC idle mode to RRC connected mode may be referred to as connecting to a cell/base station.

For a communications device in RRC idle mode the core network is aware that the communications device is present within the network, but the radio access network (RAN) part (comprising radio network infrastructure equipment such as the base stations 101 of FIG. 1 is not. The core network is aware of the location of idle mode communications devices at a paging tracking area level but not at the level of the base stations 101 in that a UE could be camped on to (configured to receive downlink signals) any of the individual base stations 101 within the paging tracking area. The core network will generally assume a communications device is located within the tracking area(s) associated with a transceiver entity most recently used for communicating with the communications device, unless the communications device has since provided a specific tracking area update (TAU) to the network. (As is conventional, idle mode communications devices are typically required to send a TAU when they detect they have entered a different tracking area to allow the core network to keep track of their location). Because the core network tracks communications devices at a tracking area level, it is generally not possible for the network infrastructure to know which specific transceiver entities (radio network node) to use when seeking to initiate contact with a communications device in idle mode. Consequently, and as is well known, when a core network is required to connect to an idle mode communications device a paging procedure is used.

In a typical currently deployed network, idle mode communications devices are configured to monitor for paging messages periodically. For communications devices operating in a discontinuous reception (DRX) mode this occurs when they wake up for their DRX awake time. Paging signals for a specific communications device are transmitted in defined frames (Paging Frames)/sub-frames (Paging Occasions) which for a given communications device may be derived from the International Mobile Subscriber Identifier (IMSI) of the communications device, as well as paging related DRX parameters established in system information transmitted within the network.

In a conventional system, a communications device thus receives and checks the contents of specific sub-frames (paging occasions) in specific frames (paging frames) to look for paging signalling. For example, in accordance with the standards set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent channel depending on implementation, e.g. on MPDCCH for MTC or for NB-IOT on NPDCCH) indicating the imminence of the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all communications devices (e.g. set at FFFE in hexa-decimal for the standard defined by 3GPP TS 36.321 version 13.5.0 Release 13 [7]). All communications devices check whether PDCCH at specific PFs/POs configured for their use include P-RNTI or not. If there is a PDSCH allocation addressed to the P-RNTI in the relevant subframe, the communications device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of communications devices, for example MTC devices, it may be expected the corresponding channel names may be modified. For example, a physical downlink control channel dedicated for MTC devices may be referred to as MPDCCH.

In proposed approaches for eNB-IoT and feMTC in accordance with 3GPP release 14, a communications device in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the communications device might receive a paging message.

FIG. 5 schematically represents a timeline of a paging occasion for a communications device operating in a known wireless telecommunications system. In the example shown in FIG. 5, one paging occasion is shown and extends from time t1 to t2. As is conventional, paging occasions for a communications device will typically occur according to a regular repeating schedule having regard to the communications device's currently configured DRX cycle. Different communications devices may have different DRX cycle lengths, and so have different times between paging occasions. For a communications device having a relatively long DRX cycle/time between paging occasions, it is possible the communications device will to some extent lose synchronisation with the radio network infrastructure equipment of the telecommunications system between paging occasions. In this case it may be helpful for the communications device to wake up in advance of the paging occasion to allow it to synchronise to the wireless telecommunications system prior to the paging occasion. An example of this is schematically shown in FIG. 5 in which the communications device wakes up at time t0 so that it can synchronise with the wireless telecommunication system in the period between times t0 and t1 so that it is able to monitor/detect MPDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree of synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the communications device may become significantly offset relative to that of the radio network infrastructure).

Once the communications device has re-synchronised to the network, it will monitor MPDCCH to determine if there is a paging message, and if so will go on to decode the PDSCH carrying the paging message in the usual way. If there is no paging message for the communications device, the communications device will go back to sleep (low power mode) until the next paging occasion. For certain types of communications devices, such as MTC devices, it may be expected that paging will occur relatively rarely (e.g. once per day for a smart utility meter), and so in many cases the communications device may wake up and synchronise to the network to monitor MPDCCH by blind decoding for a potential DCI that may schedule a PDSCH containing a paging message when in fact there is no DCI or paging message for the communications device. This represents an undesirable "waste" of resources, for example battery power, for the communications device.

Wake-Up Signal (WUS)

Previously proposed approaches for eNB-IoT and feMTC in accordance with 3GPP release 15 share several common objectives, and one of these objectives is to reduce power consumption associated with monitoring for paging messages by introducing what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8], or of a type defined in a co-pending European patent application, with application Ser. No. 17/186,065.3 [9], the contents of which are hereby incorporated by reference). The proposed WUS is carried on a new physical channel and is intended to allow communications devices to determine whether or not they need to actually decode MPDCCH in an upcoming paging occasion. That is to say, whereas in accordance with previously proposed techniques a communications device is required to decode MPDCCH during every paging occasion to determine if there is a paging message, and if so to decode PDSCH to determine if the paging message is addressed to the communications device, the WUS is instead intended to indicate to the communications device whether or not the next paging occasion contains a paging message that the communications device should decode.

A WUS is transmitted at a pre-determined/derivable time in advance of a scheduled paging occasion such that a communications device knows when to seek to receive a WUS and may contain relatively little information so that it can be decoded quickly (as compared to the blind decoding needed for MPDCCH). For example, in some implementations the WUS may include a one-bit indication of whether or not there will be a paging message transmitted in the upcoming paging occasion. In other implementations the presence and absence of the WUS provide the indication. If the WUS indicates (e.g. using a bit or is detected to be present) the upcoming paging occasion does include a paging message, any communications devices for which that paging occasion applies may proceed to decode the paging message as normal to determine if the paging message is addressed to it. If the WUS (e.g. absence of a WUS) indicates the upcoming paging occasion does not include any paging message, any communications device for which that paging occasion applies can determine from this that it does not need to monitor for a paging message during the upcoming paging occasion, and so can, for example, return to a low power mode.

In some implementations the WUS may include an identifier for a communications device that is going to be paged in the paging occasion. This identifier may identify an individual communications device or may identify a group of communications devices. The WUS may include multiple identifiers for multiple communications devices/groups. A communications device which determines the WUS is associated with an identifier that applies to it may proceed to decode the paging message as normal. Conversely, a communications device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 6:
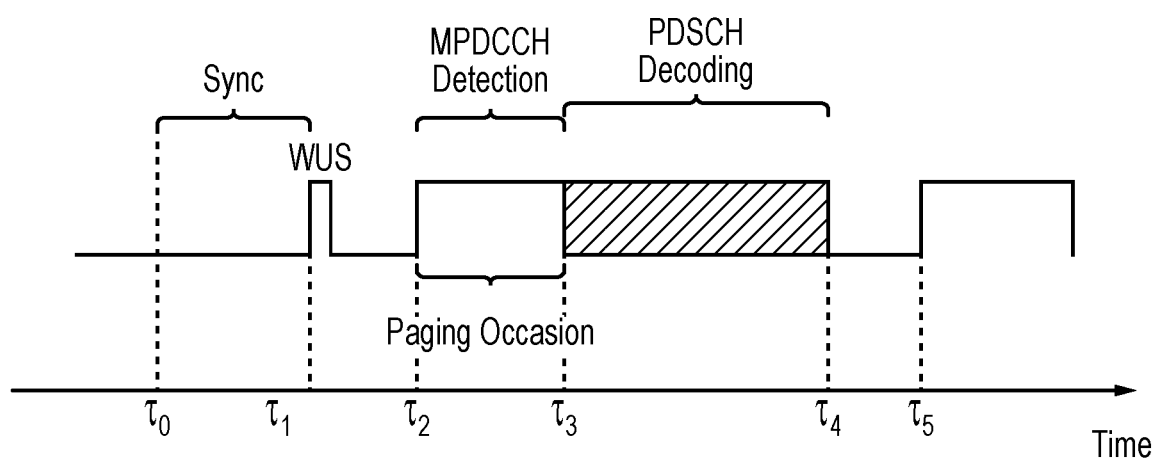
FIG. 6 provides a graphical illustration of another timing diagram representing a wake up signal transmitted with respect of a paging occasion according to a previously proposed arrangement.

FIG. 6 schematically represents a timeline for a paging occasion for a communications device operating in a wireless telecommunications system employing a WUS as proposed in association with 3GPP Release 15. In the example shown in FIG. 6, a paging occasion extends from time $\tau 2$ to $\tau 3$. As is conventional, the paging occasions will typically occur according to a regular repeating schedule having regard to the communications device's currently configured DRX cycle.

As schematically indicated in FIG. 6, a WUS is transmitted at a predetermined/derivable time $\tau 1$ in advance of the paging occasion to indicate there is a MPDCCH paging message transmission for a communications device indicated by an identifier associated with the WUS (the identifier could identify an individual communications device or a group of communications devices). The WUS can indicate that the UE should wake up in order to read the paging occasion. Here, upon detection of a WUS, the UE will proceed to fine tune its frequency and timing tracking loops if required, and blind detects for a MPDCCH between time $\tau 2$ and $\tau 3$, followed by decoding of the PDSCH carrying the paging message between time $\tau 2$ and $\tau 3$. If the UE fails to detect a WUS, it will go back to sleep and skip detecting for the MPDDCH. Hence, by using WUS, the UE will consume less energy by avoiding unnecessary monitoring of MPDCCHs. It should be appreciated that a WUS can also be used when the UE is in connected mode and when DRX is used. The WUS may contain or consist of a preamble to enable the UE to perform synchronisation, referred to as a preamble-based WUS, preamble WUS or simply P-WUS. Alternatively, or in addition, the WUS may contain or consist of reference signals (RS) similar to those used in DMRS or CRS in LTE which can be QPSK modulated, and which requires the UE to be synchronised prior to detecting it; that is the UE would need to achieve synchronisation using other signals such as an MSS or a go-to-sleep or wake-up signal (GUS). This type of WUS may be referred to as an RS based WUS, or an RS-WUS.

WUS Repetitions

One key feature of MTC is coverage enhancement, where the coverage for MTC devices can be extended by up to 20 dB (equivalent of 164 dB MCL) over that of the legacy LTE coverage. Repeated transmission of the same physical channel is the main method used to extend this coverage.

Figure 7:
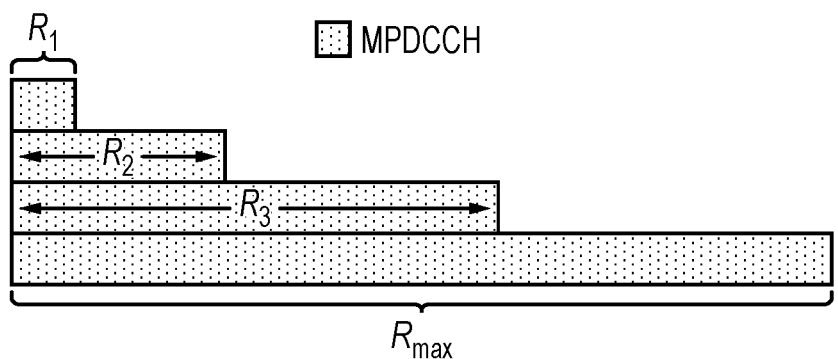
FIG. 7 provides a graphical illustration of an MPDCCH search space consisting of different MPDCCH candidates with different repetition levels.

Although the UE does not in idle mode provide updates of its coverage level to the eNodeB, the eNodeB can utilise the same coverage level for the UE as the one used when it last connected to estimate the UE's coverage level. The eNodeB can use different repetition levels for the MPDCCH and paging message when paging a UE. For MPDCCH used for paging, a search space consisting of different MPDCCH candidates with different repetition levels is used as shown in FIG. 7, where there are 4 possible repetition levels, $R_1$, $R_2$, $R_3$ and $R_{max}$. The eNodeB configures the maximum repetition number $R_{max}$ which targets a specific coverage, and the remaining repetition levels $R_1$, $R_2$ and $R_3$, are derived from $R_{max}$ using a lookup table. For example, if $R_{max}=256$, $R_1=2$, $R_2=16$, $R_3=64$. The eNodeB will use one of the repetition levels to transmit the MPDCCH, and the UE would need to blind decode the MPDCCH candidates with different repetition levels.

Figure 8:
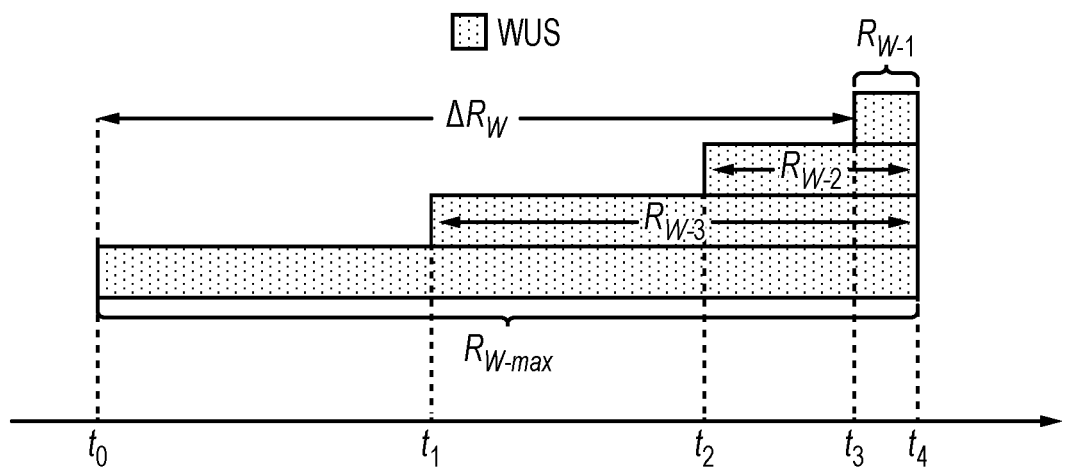
FIG. 8 provides a graphical illustration of a second search space consisting of different candidates with different repetition levels, which start at different times within the search space.

To target different coverage levels, the WUS will require different number of repetitions. In [10], it is proposed that a WUS search space similar to that of MPDCCH is used, where a maximum WUS repetition $R_{W\text{-}max}$ is defined that targets a specific cell coverage. It is also proposed that instead of having the WUS candidates start at the beginning of the search space, they start at different times but end at the end of the search space as shown in FIG. 8. In FIG. 8, the search space starts at time to where the WUS candidate with $R_{W\text{-}max}$ repetitions starts. The WUS candidates with repetition $R_{W\text{-}3}$, $R_{W\text{-}2}$ and $R_{W\text{-}1}$ start at times $t_1$, $t_2$ and $t_3$ respectively. All WUS candidates end at the same time at time $t_4$, which is also the end of the search space. It is argued that this arrangement would allow the eNodeB to transmit other channels between the start of the search space to and the start of the WUS candidates that have repetitions less than $R_{W\text{-}max}$, e.g. if the eNodeB used WUS with $R_{W\text{-}1}$ repetitions, the eNodeB can also schedule other channels between time to and $t_3$.

Figure 9:
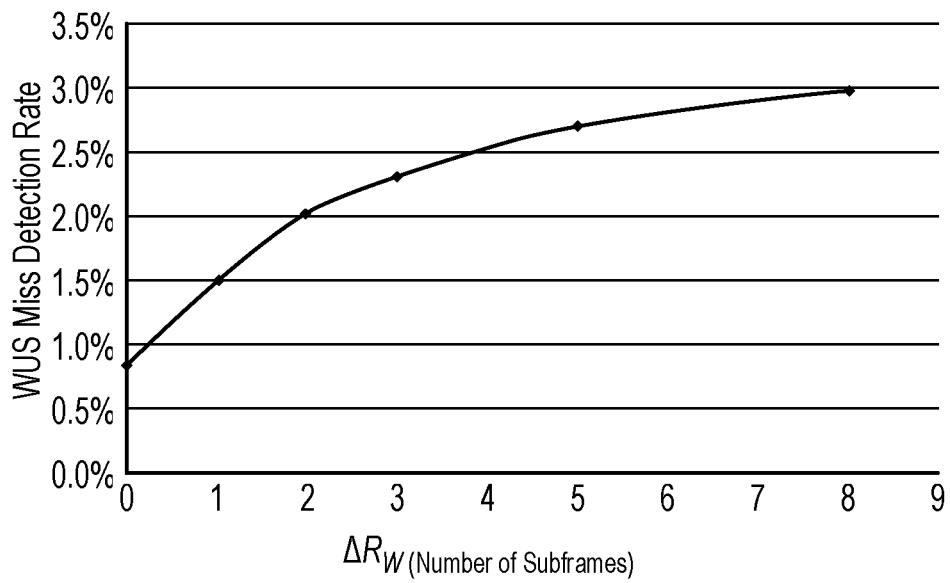
FIG. 9 graphically demonstrates a miss detection rate of WUS signals for different values of $\Delta R_W$, which is the difference between the number of times the WUS is repeated and the number of times the UE expects the WUS to be repeated.

The UE has to perform blind detection for the WUS, since the WUS may not be transmitted, depending upon whether there is a subsequently active paging occasion. If the UE is not synchronized with the network, e.g. due to time drift, the UE would have to blind detect for the start of the subframe. Introducing a WUS search space with multiple repetition levels, for WUS transmissions within that search space, will add another unknown (i.e. WUS repetition) to the UE's detection process. For example in FIG. 8, the eNodeB transmits a WUS candidate with repetition $R_{W\text{-}1}$, but regardless the UE needs to start decoding for a time $\Delta R_W$ earlier, since from the UE's point of view the WUS can start at time $t_0$, $t_1$, $t_2$, or $t_3$. This would have an impact to the UE's WUS detection performance. FIG. 9 shows the miss detection rate (i.e. a WUS is transmitted but the UE fails to detect it) for different $\Delta R_W$, i.e. the difference between the UE's assumed number of WUS repetitions and the actual number of WUS repetitions. Here, a WUS sequence using ZC 63 length as described in [9] is assumed, along with an ETU channel with 1 Hz Doppler and a received SNR of −12.5 dB (which corresponds to a 154 dB MCL using 3GPP parameters described in [11]). The actual WUS repetition is 1 subframe (14 OFDM symbols). It can be observed that the WUS miss detection rate increases as $\Delta R_W$ increases, i.e. it has gone up 3 times when $\Delta R_W$ increases to 8 subframes (note that MPDCCH repetitions can have a difference of up to 256−2=254 subframes). If it is desired that the WUS miss detection rate be maintained (e.g. at 1%) then the WUS repetition would have to increase for a targeted SNR. Hence, introducing a WUS search space with multiple WUS repetitions would increase UE complexity and power consumption.

Recognising network vendors' desire to reduce the WUS resources consumed when the UE is not at the cell edge, embodiments of the present disclosure allow for a flexible number of WUS repetitions. Embodiments of the present disclosure also define methods which may be employed to reduce WUS repetition blind decoding, thereby reducing UE complexity and power consumption when using a WUS search space.

WUS Candidate Indicator (WCI)

Figure 10:
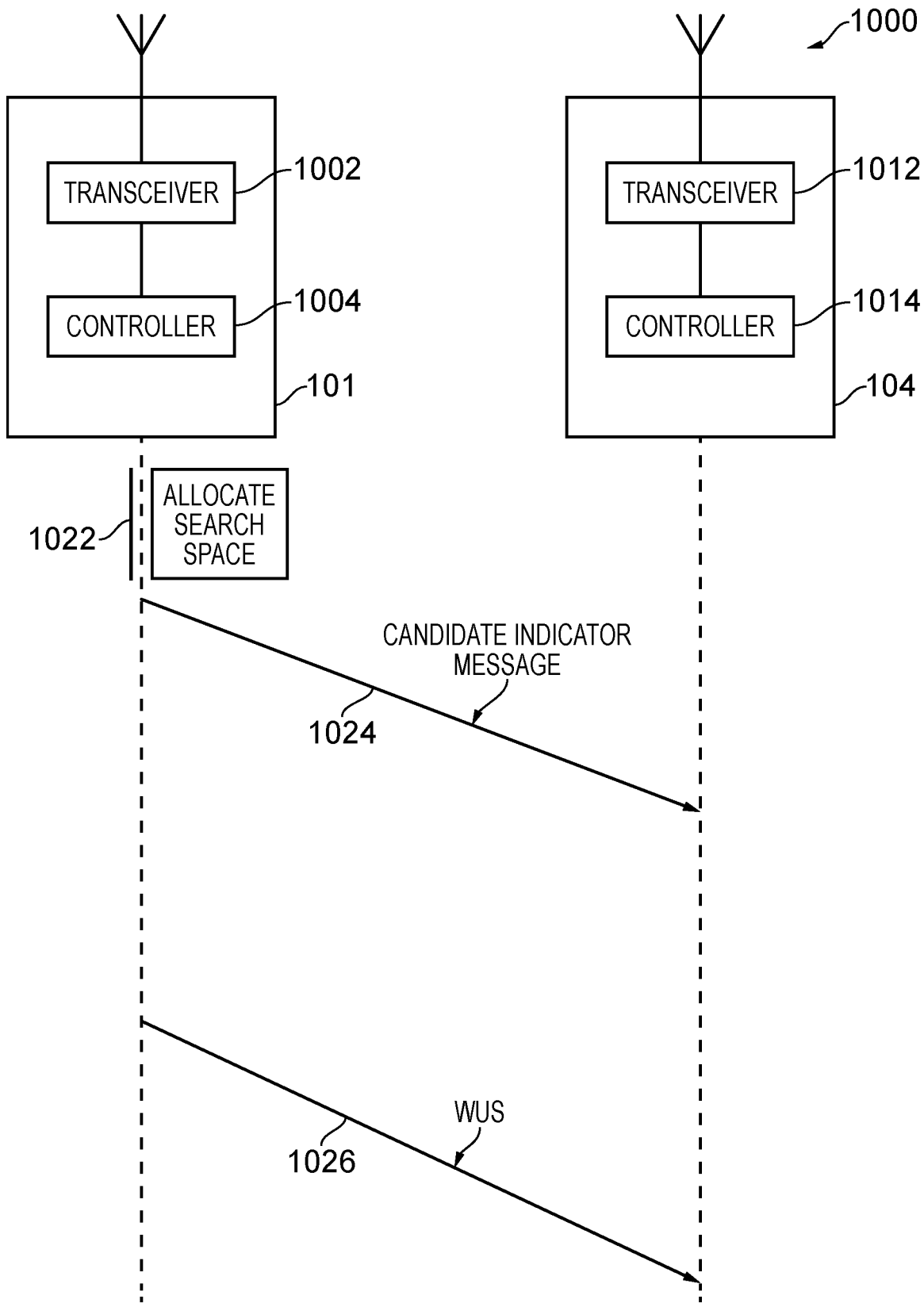
FIG. 10 shows a part schematic, part message flow diagram of communications in a wireless communications system in accordance with embodiments of the present technique.

FIG. 10 shows a part schematic, part message flow diagram representation of a communications system 1000 in accordance with embodiments of the present technique. The communications system 1000 comprises an infrastructure equipment 101 and a communications device 104 (or plurality of communications devices 104). Each of the infrastructure equipment 101 and communications device 104 comprise a transceiver (or transceiver circuitry) 1002, 1012 and a controller (or controller circuitry) 1004, 1014. Each of the controllers 1012, 1014 may be, for example, a microprocessor, a CPU, or a dedicated chipset, etc. It will be appreciated by those skilled in the art that, in arrangements of the present technique, the transceiver 1012 of the communications device 104 may not always include a transmitter or a capability for transmission, for example in scenarios where the communications device 104 is a low-power wearable device which only receives data.

As will be explained below, embodiments of the present technique can provide an arrangement in which the transceiver (or transceiver circuitry) 1002 and the controller 1004 in the infrastructure equipment 101 are configured in combination to provide a wireless access interface for communication between the infrastructure equipment 101 and the communications devices 104. The transceiver (or transceiver circuitry) 1002 and the controller 1004 in the infrastructure equipment 101 are configured to allocate a portion of radio resources of the wireless access interface as a search space 1022 for the communications devices 104 to search for a WUS transmitted 1026 by the infrastructure equipment 101, the WUS being for providing an indication to one or more of the communications devices 104 that they should receive a paging message in one or more of a plurality of temporally spaced paging occasions. The controller 1004 is configured to transmit 1024 a candidate indicator message to the communications device 104 in advance of the WUS search space, the candidate indicator message indicating one or more characteristics of the WUS by which the WUS will be transmitted as one or more candidates, wherein the one or more candidates are to be searched for detection of the WUS by the one or more communications devices 104.

In some arrangements, the one or more characteristics of the WUS comprises a repetition level at which the WUS can be transmitted 1026 as the one or more candidates to be searched for detection of the WUS by the one or more communications devices 104 within the search space, each of the repetition levels defining a number of times N which the WUS can be transmitted, the number N being an integer including one to a maximum number Nmax, wherein the transceiver circuitry 1002 under the control of the controller 1004 is then configured to determine that a paging message should be transmitted to one or more of the communications devices 104 in one or more of the plurality of temporally spaced paging occasions following the search space, if it is determined that the paging message should be transmitted to one or more of the communication devices 104, to transmit the WUS in the search space in accordance with one of the one or more repetition levels indicated in the candidate indicator message which is selected by the controller 1004 in order for the UE 104 to detect the WUS with a coupling loss affected by its location, and subsequently to transmit the paging message in one or more of the plurality of temporally spaced paging occasions following the search space.

It should be appreciated that a WUS candidate can be defined by other characteristics, e.g. code, root sequence used, in addition to its repetition. In the present disclosure repetition level is used to mean a WUS candidate but one skilled in the art will understand that this is also applicable to other characteristics of a WUS candidate.

In some arrangements of embodiments of the present technique, the portion of radio resources defining the search space are arranged within a search space grid of radio resources extending in frequency and time, wherein the extension in frequency is sufficient to span a range of frequencies over which the WUS may be transmitted and the extension in time is sufficient to span a transmission of the WUS at a highest repetition level associated with the highest number of repetitions. In some arrangements of embodiments of the present technique, the WUS is to be used by the communications device to re-synchronise its timing with the infrastructure equipment.

Although embodiments of the present technique are described below in terms of WUS transmission, those skilled in the art would appreciate that embodiments of the present technique described above in relation to FIG. 10 would equally apply to arrangements where a downlink message is not a WUS, but may be for example some other form of synchronisation or indication signal, which may include but is not limited to one of a GUS, MSS or a paging message.

Figure 11:
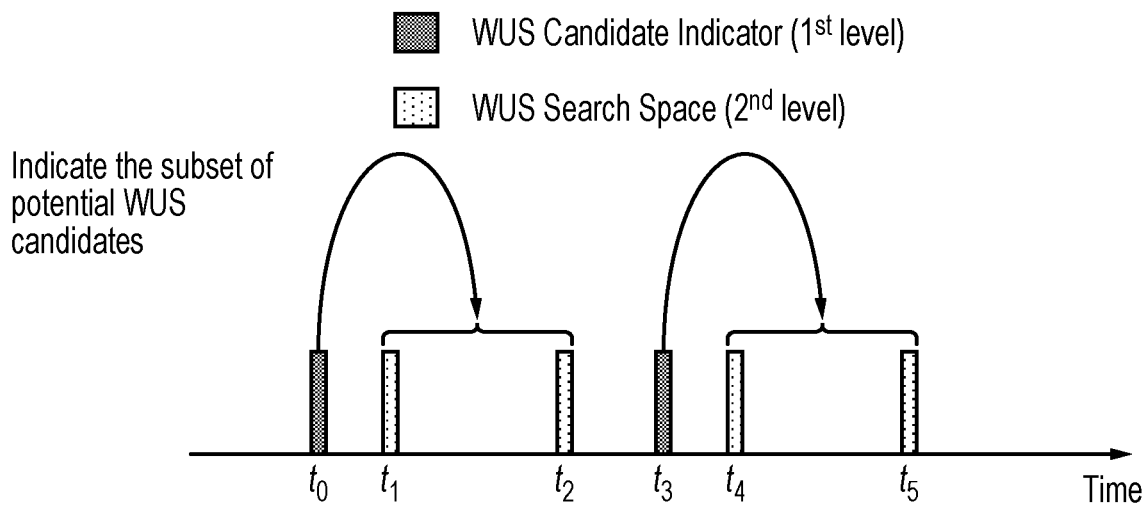
FIG. 11 shows a WUS candidate indicator for two adjacent WUS search spaces, in accordance with embodiments of the present technique.

Embodiments of the present technique may involve the transmission of a WUS Candidate Indicator (WCI) prior to at least one WUS Search Space (WUS SS). The WCI tells the UE the subset of WUS candidates that the subsequent WUS Search Space(s) would use. An example is shown in FIG. 11, where the UE monitors for WUS in a WUS SS periodically, where the WUS is transmitted in the search space with one of the repetition levels shown in FIG. 8. A WCI is transmitted prior to every two WUS SS occasions, e.g. a WCI at time to for WUS SS at time $t_1$ & $t_2$ and a WCI at time $t_3$ for WUS SS at time $t_4$ and $t_5$. The WCI at time to can indicate that only candidates with repetition $R_{W-1}$ and $R_{W-2}$ are used and this would halve the UE's blind detection processing and would reduce the required number of repetitions of the WUS or improve the detection performance (e.g. reduce miss detection rate). In this example, the WCI at time $t_3$ indicates a different subset of candidates e.g. $R_{W-3}$ and $R_{W-max}$ (Note: The set of WUS candidates indicated is up to the eNodeB scheduler). The WCI and the WUS search space can be viewed as a two level WUS where the $1^{st}$ level indicates characteristics for the $2^{nd}$ level of WUS. It should be appreciated that although the number of candidates are reduced in the WUS search space, the eNodeB may still not transmit any WUS since WUS is only transmitted if the corresponding PO(s) is active.

In an example arrangement, the WCI indicates the one or more repetition levels of the WUS. It should be noted that in a search space there may be more than one candidate with the same number of repetitions, e.g. as in MPDCCH. In other words, the candidate indicator message (WCI) indicates one or more of the repetition levels (and can also indicate one or more WUS candidates at the same repetition level). Hence, by indicating the repetition levels, the WCI will directly also indicate WUS candidates that share the indicated repetition level(s). It should also be noted that apart from repetitions, there are other characteristics of the candidates that could be indicated by the WCI e.g. WUS sequences used. In a practical implementation, it is expected that the WCI will indicate only 1 WUS candidate (or one WUS repetition level).

In one example arrangement, the WCI is carried by a synchronisation signal. In other words, the candidate indicator message (WCI) comprises part of a synchronisation signal transmitted by the infrastructure equipment to the communications device, the synchronisation signal being for use by the communications device to re-synchronise its timing with the infrastructure equipment.

Figure 12:
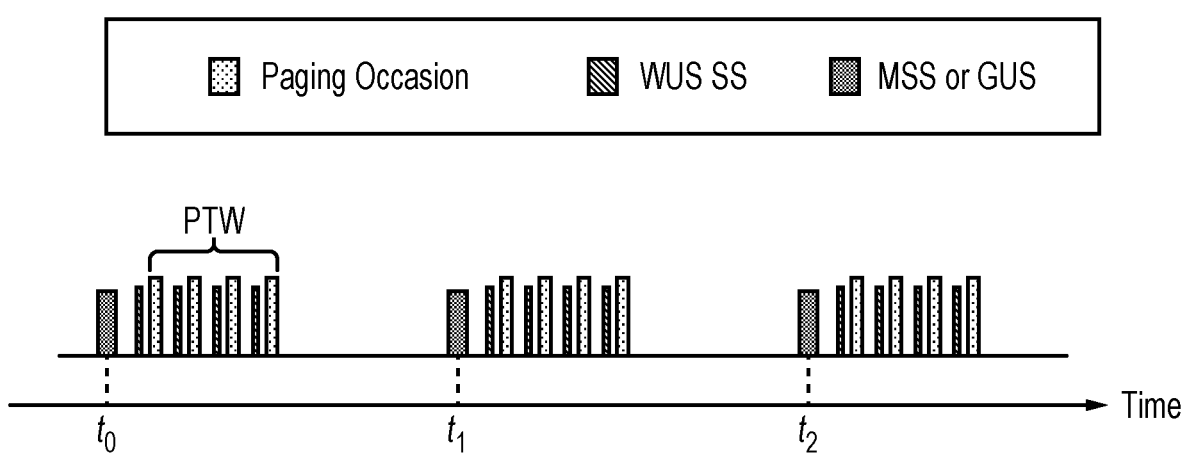
FIG. 12 illustrates how an MSS or a GUS may be transmitted prior to a paging time window in order to compensate for UE time drift in accordance with embodiments of the present technique.

In our co-pending European patent application, with application number EP17193861 [12], the contents of which are hereby incorporated by reference, it is proposed that a preamble such as a MTC Sync Signal (MSS) or a Go To Sleep & Wake Up Signal (GUS) [13] is transmitted prior to N PTWs as shown in FIG. 12 (where N=1). This is to combat the issue of accumulation of time drifts due to WUS not being transmitted (see [12] for more details). In co-pending European patent applications, with application numbers EP17169821 [14] and EP17201748 [15], the contents of each of which are hereby incorporated by reference, it is also proposed that the MSS can be configured to carry information. Hence, an implementation of this arrangement is for the MSS (or any appropriate sync signal, e.g. a GUS) to carry the WCI. It should be appreciated that the WCI and the WUS search space need not share the same frequency resource and can occur in different narrowbands. In other words, the WCI is one of a go-to-sleep or wake-up signal, GUS or a machine type communication synchronisation signal, MSS.

In one example arrangement, the WCI is transmitted periodically where the resources (frequency/narrowband and time) used are configured by the network via unicast RRC signalling (referred to herein simply as "RRC signalling") or SIB broadcast. Here the WCI is always transmitted using its configured frequency resource and periodicity. In other words, the candidate indicator message (WCI) is transmitted periodically and in radio resources configured via one of radio resource control, RRC, signalling or a system information block, SIB, broadcast by the infrastructure equipment.

In one example arrangement, the WCI is only transmitted if there is a reduction in the number of WUS candidates in the WUS search space. In other words the candidate indicator message (WCI) is transmitted if it is determined by the infrastructure equipment that the number of the one or more repetition levels in the search space has changed for the transmission of the WUS in the search space. Therefore the infrastructure equipment determines that if the number of candidates is reduced from a previous search space, such as for example a total maximum number of candidates (repetitions) then an MSS providing an WCI should be transmitted. In another, example the WCI is transmitted if the number of repetitions of the transmitted WUS (WUS candidates) changes from one search space to another, that is to say a WCI is transmitted if the number of WUS candidates in a subsequent WUS search space is smaller or larger than the current/previous number of WUS candidates In other words, the candidate indicator message is transmitted by the infrastructure equipment if it is determined by the infrastructure equipment that the repetition level with which the wake-up signal is to be transmitted is different to the maximum number of repetitions Nmax or alternatively, the candidate indicator message is transmitted by the infrastructure equipment if it is determined by the infrastructure equipment that the repetition level with which the wake-up signal is to be transmitted is smaller or larger than the repetition level selected for a previous search space indicated by a previous candidate indicator message.

In one example arrangement, the WCI is transmitted as part of a DCI (downlink control information), e.g. the WUS is a field or state within a DCI. In other words, the candidate indicator message (WCI) comprises part of a downlink control information, DCI, transmission by the infrastructure equipment. Note that a "state" refers to an encoding of bits that is not used to signal anything else via DCI (e.g. an all zero string in the DCI could be a "state" that would indicate WCI). In an example arrangement, the DCI is a compact DCI for example consisting of a single WCI bit, protected by a CRC.

In one example arrangement, there are known locations where the UE must monitor for WCI. For example, the UE is informed that it must monitor PDCCH at every nth paging occasion for WCI. The eNodeB can then optionally transmit WCI at that paging occasion. In other words, the infrastructure equipment is configured to transmit to the UE an indication of one or more locations within the radio resources that the UE should monitor for the candidate indicator message.

In one example arrangement, the number of repetitions in the WUS search space reverts to $R_{W\_max}$ periodically (where the periodicity can be specified or signalled to the UE via RRC signalling) This provides a "fallback mechanism": if the UE becomes unreachable because it is monitoring too low a number of repetitions in the WUS search space (for whatever reason), being able to periodically reach the UE using $R_{W\_max}$ increases system robustness. In other words, the number of repetitions of at least one of the selected candidate radio resources is periodically set to be the highest of the N different repetition levels. This periodicity may be either predetermined and known by the UE, or may be indicated to the UE via RRC signalling.

In one example arrangement, the UE periodically reads a paging occasion regardless of the state of WUS. During such a paging occasion, the UE also monitors WCI for an indication that the WUS search space has changed. As will be understood, there is a set of paging occasions that the UE will monitor and which are controlled by WUS. However, the UE will occasionally ignore the WUS in order to provide robustness against WUS unreliability. For example, if the WUS becomes unreliable, sometimes the UE needs to read the paging message anyway, and the eNodeB can inform the UE that the WUS is suffering from unreliability. In other words, the UE is configured to periodically read, irrespective of the indication provided by the wake-up signal, one or more of a plurality of paging occasions. The UE is configured to monitor, during each of the one or more of the plurality of paging occasions that is periodically read by the communications device irrespective of the indication provided by the wake-up signal, for a candidate indicator message indicating that the portion of radio resources defining the search space has changed.

Figure 13:
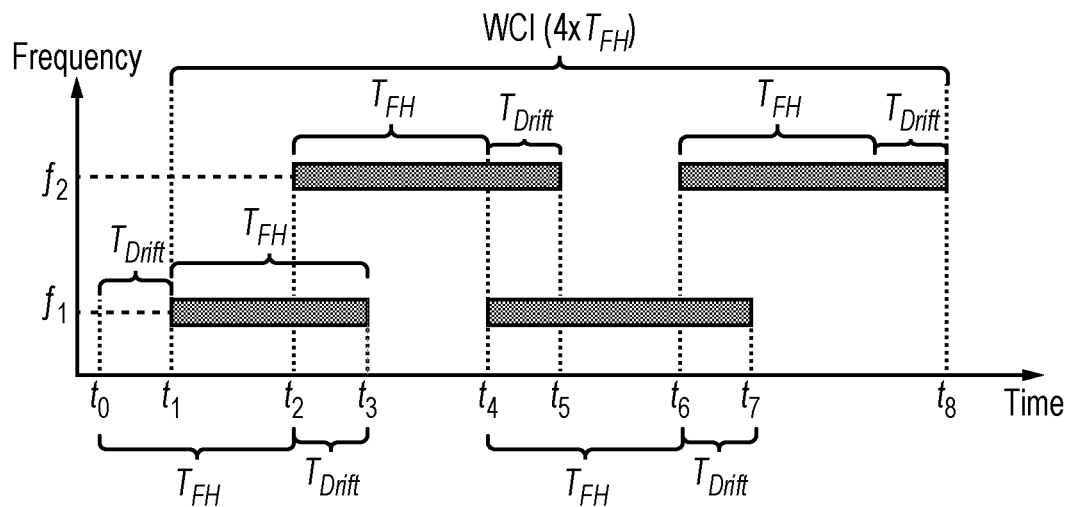
FIG. 13 shows an arrangement of WUS candidate indicator which is transmitted with a frequency hopping pattern, in accordance with embodiments of the present technique.

In one example arrangement, frequency hopping may be used on the WCI or the MSS carrying the WCI, such as the frequency hopping method described in a co-pending European patent application, with application number EP17202451 [16], the contents of which are hereby incorporated by reference. An example of this is shown in FIG. 13, where the WCI is frequency hopped between $f_1$ and $f_2$. A UE that has time drifted by $T_{Drift}$ would start to detect for the WCI (or MSS, GUS etc.) in advance at time $t_0$ (i.e. $T_{Drift}$ prior to the start of WCI at time $t_1$). In this example the WCI (or MSS) hopping period is $T_{FH}$, with a total transmission time period of $4 \times T_{FH}$ (i.e. the WCI/MSS frequency hops 4 times). Since the UE may have drifted by $T_{Drift}$ and the UE would perform a frequency hop every $T_{FH}$, some overlapping of at least $T_{Drift}$ between the WCI at frequency $f_1$ and $f_2$ is required as shown in FIG. 13, where there are overlaps between time $t_2$ & $t_3$, $t_4$ & $t_5$ and $t_6$ & $t_7$. Although the total duration of the WCI is $4 \times T_{FH}$, the UE would detect the WCI for a time duration of $4 \times T_{FH} + T_{Drift}$ (i.e. from time $t_0$ to $t_8$ in FIG. 13) to ensure it covers the entire WCI transmission. The value of $T_{Drift}$ can be set to the worst case time drift for a compliant UE (i.e. a compliant UE would not exceed this amount of time drift). Although this example is for a frequency hop between two frequencies, it should be appreciated that it can be extended for frequency hopping with more than two frequencies. It should also be noted that the frequencies $f_1$ and $f_2$ in the example in FIG. 13 can overlap 100% instead of only partially, as described in [16]. In other words, the infrastructure equipment is configured to transmit the candidate indicator message (WCI) in a first frequency band during a first transmission period, and transmit the candidate indicator message (WCI) in a second frequency band during a second transmission period. The first frequency band and the second frequency band are separated in frequency and the first transmission period and the second transmission period at least partially overlap in time.

In examples of this frequency hopping arrangement of embodiments of the present technique, the frequency hopping pattern is different for different cells. For example the frequency hopping sequence is a function of the cell ID. This is to randomize inter-cell interference between neighbouring cells. In other words, the first frequency band, second frequency band, first transmission period and second transmission period are each determined in accordance with a frequency hopping pattern of a first cell provided by the infrastructure equipment, wherein the frequency hopping pattern is different to a frequency hopping pattern of a second cell provided by a second infrastructure equipment of the wireless communications system. In some examples, the frequency hopping pattern of a cell is dependent on an identifier of the cell.

In one example arrangement, a Zadoff-Chu sequence (ZC) is used for the WCI (e.g. MSS) and the different roots of the ZC are used to indicate different subsets of WUS candidates. For example, two ZC roots are used to indicate whether the subset WUS candidates are $\{R_{W-1}, R_{W-2}\}$ or $\{R_{W-3}, R_{W-max}\}$ for the 4 WUS candidate search space in FIG. 8. In other words, the candidate indicator message (WCI) is based on a Zadoff Chu sequence. Here, the Zadoff Chu sequence comprises a plurality of roots, each of the plurality of roots being used to indicate a different subset of the repetition levels for WUS candidates within the search space which have been selected for the repeated transmission of the WUS.

In one example arrangement, the WCI is formed from a MSS, the MSS being based on a cover code used to indicate the different subsets of WUS candidates. A cover code is any code which is multiplied with a UE's encoded symbols. An example cover code is a Pseudo-Random Noise (PN) sequence. In other words, a cover code of the GUS or MSS is used to indicate which of a plurality of subsets of the plurality of repetition levels may be used to transmit the WUS as candidates within the search space for the repeated transmission of the WUS.

In one example arrangement, a Gold Sequence is used for the WCI and different characteristics of the sequence, e.g. different cyclic shifts of the Gold sequence are used to indicate different WUS candidate subsets. Alternatively, different sequences can be used to indicate different WUS candidate subsets (repetition levels). In other words, the candidate indicator message (WCI) is based on a Gold sequence, wherein a different denomination of a characteristic of the Gold sequence is used to indicate a different subset of the plurality of repetition levels which may be used to transmit the WUS as candidates within the search space which have been selected for the repeated transmission of the WUS. The characteristic of the Gold sequence may be an amount of cyclic shift of the Gold sequence, or alternatively a different Gold sequence is used to indicate a different subset of candidate radio resources which have been selected for the repeated transmission of the WUS.

Figure 14:
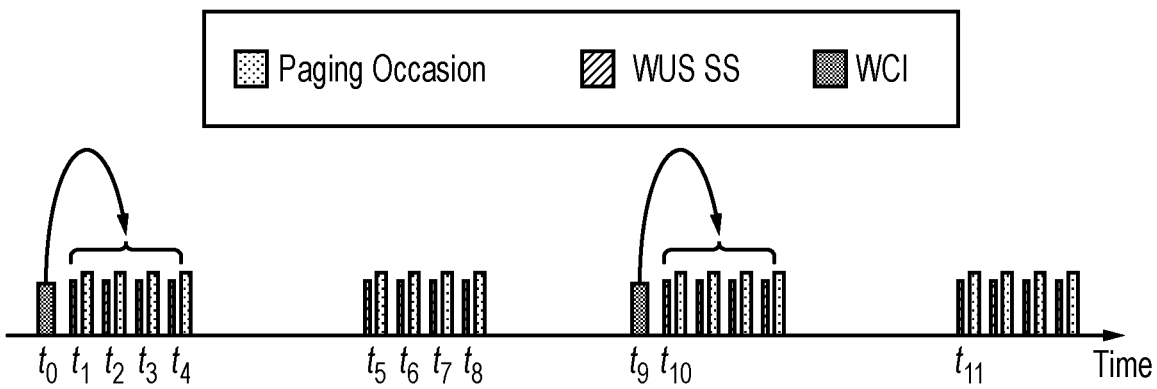
FIG. 14 shows an arrangement in which a WUS candidate indicator may indicate the candidates for a fixed number of WUS search spaces, in accordance with embodiments of the present technique.

In one example arrangement, the number of WUS search space periods which can be indicated by one WCI is signalled to the UE, e.g. via RRC Signalling (including via broadcast in SIB), dynamically indicated in the WCI or specified in the specifications (predetermined). In other words, the candidate indicator message (WCI) indicates the one or more of the repetition levels which may be used to transmit the WUS as candidates within the search space, wherein the number of WUS search spaces that the WCI relates to is either predetermined and known by the UE or indicated to the UE via one of RRC signalling, a SIB broadcast by the infrastructure equipment or dynamically indicated by the candidate indicator message. For example in FIG. 14, the WCI is configured to indicate for 4 consecutive WUS search spaces, that is, the WCI in time $t_0$ would indicate the subset of WUS candidates for WUS search spaces in time $t_1$, $t_2$, $t_3$ and $t_4$. Since there is no WCI for WUS search space in time $t_5$, $t_6$, $t_7$ and $t_8$, the UE would monitor all the WUS candidates in those WUS search spaces. It should be appreciated that although these 4 WUS search spaces fall within a PTW, the WCI need not be restricted to relate to those WUS search spaces in a PTW nor must is it relate to all WUS search spaces in a PTW. For example, the WUS can relate to the first two WUS search spaces in a PTW. In a further example, if the WCI relates to 6 WUS search spaces and each PTW comprises 4 WUS search spaces, the WCI covers 1.5 PTWs.

Figure 15:
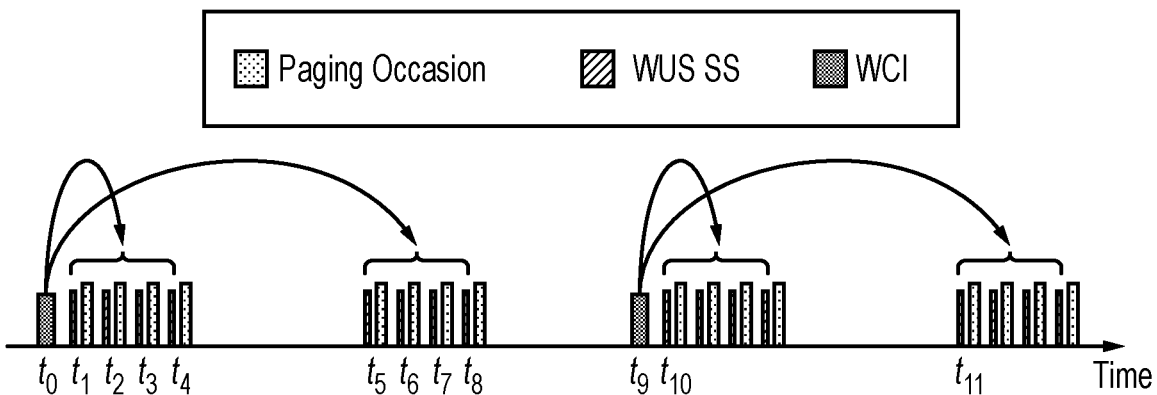
FIG. 15 shows an arrangement in which a WUS candidate indicator may be used to update the information conveyed by a previous WUS candidate indicator, in accordance with embodiments of the present technique.

In one example arrangement, the UE would monitor for the subset of WUS candidates as indicated by the last WCI. That is, the UE continues to use the information provided by the last detected WCI until it is updated by another WCI. For example in FIG. 15, the WCI at time to would indicate a WUS candidate subset e.g. $\{R_{W-1}, R_{W-2}\}$ and the UE will continue to use this subset for the WUS search space in time $t_1$ to $t_8$ until it is updated by WCI at time $t_9$. The WCI at time $t_9$ is then used by the UE until then next WCI is transmitted.

In one example arrangement, in addition to indicating the subset of WUS candidates (repetition levels) in a WUS search space, the WCI can also be used as a reset. That is the WCI would indicate that all WUS candidates should be monitored by the UE. In other words, the candidate indicator message (WCI) comprises a candidate reset, the candidate reset indicating to the UE that the UE should search for WUS in all of the plurality of possible repetitions levels within the search space. This can be used in the arrangement described in FIG. 15, where a WCI Reset can be transmitted.

In one example arrangement, one of the subset of WUS Candidates is NULL. That is the WCI can indicate that no WUS will be transmitted in the at least one subsequent WUS search space(s). In other words, the candidate indicator message (WCI) indicates to the UE that the UE should not search for the WUS in one or more of the plurality of candidate resources. This allows the UE to go to sleep during these WUS search space(s).

Figures 16A, 16B:
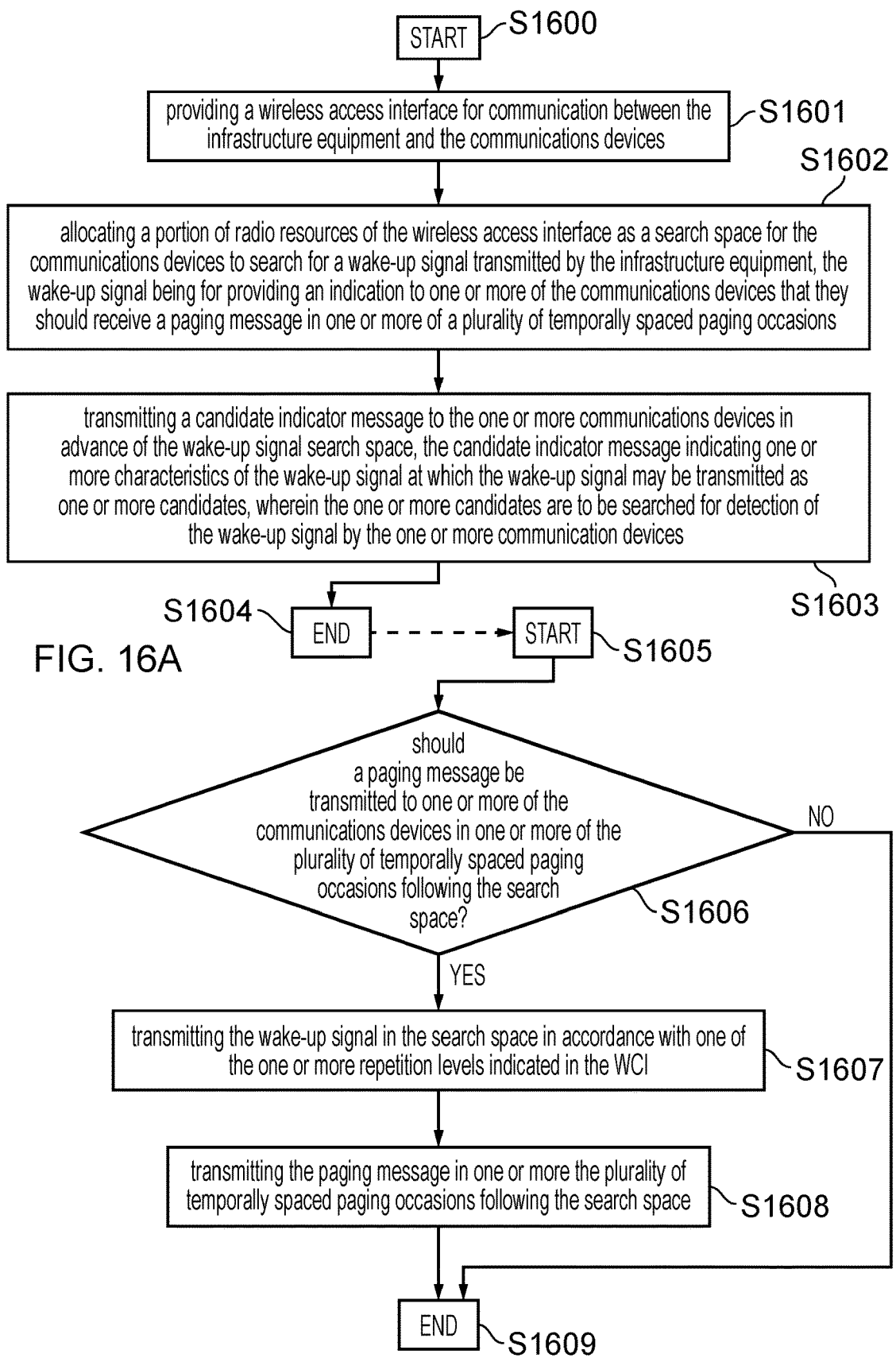
FIG. 16A shows a first flow diagram illustrating a first process of communications in a communications system in accordance with embodiments of the present technique.
FIG. 16B shows a second flow diagram illustrating a second process of communications in a communications system in accordance with embodiments of the present technique.

FIG. 16A shows a first flow diagram illustrating a first process of communications in a communications system comprising an infrastructure equipment and a UE in accordance with embodiments of the present technique. The process is a method of operating the infrastructure equipment. The process starts in step S1600. The method comprises in step S1601, providing a wireless access interface for communication between the infrastructure equipment and the UE. In step S1602, the method comprises allocating a portion of radio resources of the wireless access interface as a search space for the UE to search for a WUS transmitted by the infrastructure equipment, the WUS being for providing an indication to the UE that it should receive a paging message in one or more of a plurality of temporally spaced paging occasions. In step S1603, the method comprises transmitting a candidate indicator message to the UE in advance of the WUS search space, the candidate indicator message indicating one or more characteristics of the WUS by which the WUS will be transmitted as one or more candidates, wherein the one or more candidates are to be searched for detection of the WUS by the UE. The process ends in step S1604.

FIG. 16B shows a second flow diagram illustrating a second process of communications in a communications system comprising an infrastructure equipment and a UE in accordance with embodiments of the present technique. The process of FIG. 16B continues from the process of FIG. 16A, such that in some embodiments of the present technique, all steps from both FIGS. 16A and 16B may be carried out in the order described. Of course, it should be appreciated that in some embodiments of the present technique, only a subset of those steps described in FIGS. 16A and 16B will be carried out, for example (but not limited to) steps S1600 to S1604 described in relation to FIG. 16A. The process of FIG. 16B starts in step S1605, subsequently to the ending of the process of FIG. 16A in step S1604. The method comprises, in step S1606, determining whether or not a paging message should be transmitted to the UE in one or more of the plurality of temporally spaced paging occasions following the search space. If the infrastructure equipment does not determine that a paging message should be transmitted to the UE in one or more of the plurality of temporally spaced paging occasions following the search space, then the process continues to step S1609, where it ends. If it is determined that the paging message should be transmitted to the UE, then the method comprises, in step S1607, transmitting the wake-up signal in the search space in accordance with one of the one or more repetition levels indicated in the candidate indicator message. The method subsequently comprises, in step S1608, transmitting the paging message in one or more of the plurality of temporally spaced paging occasions following the search space, before ending in step S1609.

In the methods described by the flow diagrams of FIGS. 16A and 16B, it should be noted that the plurality of candidates in the WUS search space, where a candidate is defined as a combination of physical characteristics of a WUS transmission (e.g. repetition, time resource, code, root sequence), are here associated with a number, N, of different repetition levels for the transmission of a WUS, wherein the different repetition levels correspond with different numbers of repetitions for the transmission of a message.

As described above, embodiments of the present technique enable the use of a signal (which may be a synchronisation signal such as an additional synchronisation signal (MSS) or GUS) to be transmitted by the infrastructure equipment, which can be used to indicate one or more sets of possible repetitions for one or more following signals (e.g. WUS signals).

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment in a wireless communications system comprising the infrastructure equipment forming part of a wireless communications network and a plurality of communications devices, wherein the method comprises providing a wireless access interface for communication between the infrastructure equipment and the communications devices, allocating a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and transmitting a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

Paragraph 2. A method of operating an infrastructure equipment according to Paragraph 1, wherein the one or more characteristics of the wake-up signal comprises a repetition level at which the wake-up signal can be transmitted as the one or more candidates to be searched for detection of the wake-up signal by the one or more communications devices within the search space, each of the repetition levels defining a number of times N which the wake-up signal can be transmitted, the number N being an integer including one to a maximum number Nmax, wherein the method comprises determining that a paging message should be transmitted to one or more of the communications devices in one or more of the plurality of temporally spaced paging occasions following the search space, if it is determined that the paging message should be transmitted to one or more of the communication devices, transmitting the wake-up signal in the search space in accordance with one of the one or more repetition levels indicated in the candidate indicator message, and transmitting the paging message in one or more of the plurality of temporally spaced paging occasions following the search space.

Paragraph 3. A method of operating an infrastructure equipment according to Paragraph 1 or Paragraph 2, wherein the portion of radio resources defining the search space is arranged within a search space grid of radio resources extending in frequency and time, wherein the extension in frequency is sufficient to span a range of frequencies over which the wake-up signal may be transmitted and the extension in time is sufficient to span a transmission of the wake-up signal at the maximum number of repetitions Nmax.

Paragraph 4. A method of operating an infrastructure equipment according to any of Paragraphs 1 to 3, wherein the candidate indicator message includes part of a synchronisation signal transmitted by the infrastructure equipment to the communications devices, the synchronisation signal being used by the communications devices to re-synchronise its timing with the infrastructure equipment.

Paragraph 5. A method of operating an infrastructure equipment according to Paragraph 4, wherein the synchronisation signal is one of a go-to-sleep or wake-up signal, GUS, or a machine type communication synchronisation signal, MSS.

Paragraph 6. A method of operating an infrastructure equipment according to Paragraph 5, wherein the GUS or MSS is formed using a cover code, the cover code being is used to indicate one or more repetition levels at which the wake-up signal will be transmitted as one or more candidates to be searched for detection.

Paragraph 7. A method of operating an infrastructure equipment according to Paragraph 6, wherein the cover code is a pseudo-random noise, PN, sequence.

Paragraph 8. A method of operating an infrastructure equipment according to any of Paragraphs 1 to 7, wherein the candidate indicator message is transmitted periodically and in radio resources configured via one of unicast radio resource control, RRC, signalling or a system information block, SIB, broadcast by the infrastructure equipment.

Paragraph 9. A method of operating an infrastructure equipment according to any of Paragraphs 1 to 8, wherein the candidate indicator message is transmitted by the infrastructure equipment if it is determined by the infrastructure equipment that the repetition level with which the wake-up signal is to be transmitted is different to the maximum number of repetitions Nmax.

Paragraph 10. A method of operating an infrastructure equipment according to any of Paragraphs 1 to 9, wherein the candidate indicator message is transmitted by the infrastructure equipment if it is determined by the infrastructure equipment that the repetition level with which the wake-up signal is to be transmitted is smaller or larger than the repetition level selected for a previous search space indicated by a previous candidate indicator message.

Paragraph 11. A method of operating an infrastructure equipment according to any of Paragraphs 1 to 10, wherein the candidate indicator message comprises part of a downlink control information, DCI, transmission by the infrastructure equipment.

Paragraph 12. A method of operating an infrastructure equipment according to any of Paragraphs 1 to 11, wherein the method comprises
transmitting to the communications devices an indication of one or more locations within the wireless access interface that the communications devices should monitor for the candidate indicator message.

Paragraph 13. A method of operating an infrastructure equipment according to any of Paragraphs 1 to 12, wherein the number of repetitions of the repetition level with which the wake-up signal is to be transmitted is periodically set to be the maximum number of repetitions Nmax.

Paragraph 14. A method of operating an infrastructure equipment according to Paragraph 13, wherein the periodicity is predetermined and known by the communications devices.

Paragraph 15. A method of operating an infrastructure equipment according to Paragraph 13, wherein the periodicity is indicated to the communications devices via unicast RRC signalling.

Paragraph 16. A method of operating an infrastructure equipment according to any of Paragraphs 1 to 15, wherein the method comprises
transmitting the candidate indicator message in a first frequency band during a first transmission period, and transmitting the candidate indicator message in a second frequency band during a second transmission period, wherein the first frequency band and the second frequency band are separated in frequency and the first transmission period and the second transmission period at least partially overlap in time.

Paragraph 17. A method of operating an infrastructure equipment according to Paragraph 16, wherein the first frequency band, second frequency band, first transmission period and second transmission period are each determined in accordance with a frequency hopping pattern of a first cell provided by the infrastructure equipment,
wherein the frequency hopping pattern is different to a frequency hopping pattern of a second cell provided by a second infrastructure equipment of the wireless communications system.

Paragraph 18. A method of operating an infrastructure equipment according to Paragraph 17, wherein the frequency hopping pattern of a cell is dependent on an identifier of the cell.

Paragraph 19. A method of operating an infrastructure equipment according to any of Paragraphs 1 to 18, wherein the candidate indicator message is based on a Zadoff Chu sequence.

Paragraph 20. A method of operating an infrastructure equipment according to Paragraph 19, wherein the Zadoff Chu sequence comprises a plurality of roots, each of the plurality of roots being used to indicate a different subset of candidate radio resources which have been selected for the repeated transmission of the wake-up signal.

Paragraph 21. A method of operating an infrastructure equipment according to any of Paragraphs 1 to 20, wherein the candidate indicator message is based on a Gold sequence.

Paragraph 22. A method of operating an infrastructure equipment according to Paragraph 21, wherein a different denomination of a characteristic of the Gold sequence is used to indicate a different subset of candidate radio resources which have been selected for the repeated transmission of the wake-up signal.

Paragraph 23. A method of operating an infrastructure equipment according to Paragraph 22, wherein the characteristic of the Gold sequence is an amount of cyclic shift.

Paragraph 24. A method of operating an infrastructure equipment according to Paragraph 23, wherein a different Gold sequence is used to indicate a different subset of candidate radio resources which have been selected potentially for the repeated transmission of the wake-up signal.

Paragraph 25. A method of operating an infrastructure equipment according to any of Paragraphs 1 to 24, wherein the candidate indicator message comprises a candidate reset, the candidate reset indicating to the communications devices that the communications devices should search for the wake-up signal in the search space for candidates according to all of the plurality of repetition levels.

Paragraph 26. A method of operating an infrastructure equipment according to any of Paragraphs 1 to 25, wherein the candidate indicator message indicates to the communications devices that the communications devices should not search for candidates of the wake-up signal in the search space according to one or more of the plurality of repetition levels.

Paragraph 27. An infrastructure equipment forming part of a wireless communications system comprising the infrastructure equipment and a plurality of communications devices, wherein the infrastructure equipment comprises transceiver circuitry and controller circuitry which are configured in combination to provide a wireless access interface for communication between the infrastructure equipment and the communications devices,
to allocate a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and to transmit a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

Paragraph 28. Circuitry for an infrastructure equipment forming part of a wireless communications system comprising the infrastructure equipment and a plurality of communications devices, wherein the infrastructure equipment comprises transceiver circuitry and controller circuitry which are configured in combination to provide a wireless access interface for communication between the infrastructure equipment and the communications devices, to allocate a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and to transmit a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

Paragraph 29. A method of operating a wireless communications system comprising an infrastructure equipment and a plurality of communications devices, wherein the method comprises providing a wireless access interface for communication between the infrastructure equipment and the communications devices, allocating a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and transmitting a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

Paragraph 30. A wireless communications system comprising an infrastructure equipment and a plurality of communications devices, wherein the infrastructure equipment and the communications devices each comprise transceiver circuitry and controller circuitry, wherein the transceiver circuitry and the controller circuitry of the infrastructure equipment are configured in combination to provide a wireless access interface for communication between the infrastructure equipment and the communications devices, to allocate a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and to transmit a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

Paragraph 31. Circuitry for a wireless communications system comprising an infrastructure equipment and a plurality of communications devices, wherein the infrastructure equipment and the communications devices each comprise transceiver circuitry and controller circuitry, wherein the transceiver circuitry and the controller circuitry of the infrastructure equipment are configured in combination to provide a wireless access interface for communication between the infrastructure equipment and the communications devices, to allocate a portion of radio resources of the wireless access interface as a search space for the communications devices to search for a wake-up signal transmitted by the infrastructure equipment, the wake-up signal being for providing an indication to one or more of the communications devices that they should receive a paging message in one or more of a plurality of temporally spaced paging occasions, and to transmit a candidate indicator message to the one or more communications devices in advance of the wake-up signal search space, the candidate indicator message indicating one or more characteristics of the wake-up signal by which the wake-up signal may be transmitted as one or more candidates, wherein the one or more candidates are to be searched for detection of the wake-up signal by the one or more communication devices.

Paragraph 32. A method of operating a communications device in a wireless communications system comprising an infrastructure equipment and the communications device, wherein the method comprises receiving a candidate indicator message from the infrastructure equipment in advance of a portion of radio resources defining a search space in which the communications device is operable to search for a wake-up signal transmitted by the infrastructure equipment, wherein the wake-up signal is for providing an indication to the communications device that it should receive a paging message in one or more of a plurality of temporally spaced paging occasions, and wherein the candidate indicator message indicates one or more characteristics of the wake-up signal by which the wake-up signal may be transmitted as one or more candidates, wherein the one or more candidates are to be searched for detection of the wake-up signal by the one or more communication devices.

Paragraph 33. A method of operating a communications device according to Paragraph 32, wherein the method comprises
periodically monitoring during one or more of the plurality of paging occasions, irrespective of the indication provided by the wake-up signal, for a candidate indicator message indicating that the portion of radio resources defining the search space has changed.

Paragraph 34. A method of operating a communications device according to Paragraph 32 or Paragraph 33, wherein the method comprises receiving a plurality of wake-up signals with a number of repetitions in one of the selected one or more candidate radio resources until the communications device receives a second candidate indicator message, the second candidate indicator message indicating that selected one or more of a plurality of candidate radio resources has changed.

Paragraph 35. A communications device forming part of a wireless communications system comprising an infrastructure equipment and the communications device, wherein the communications device comprises transceiver circuitry and controller circuitry which are configured in combination
to receive a candidate indicator message from the infrastructure equipment in advance of a portion of radio resources defining a search space in which the communications device is operable to search for a wake-up signal transmitted by the infrastructure equipment,
wherein the wake-up signal is for providing an indication to the communications device that it should receive a paging message in one or more of a plurality of temporally spaced paging occasions, and
wherein the candidate indicator message indicates one or more characteristics of the wake-up signal by which the wake-up signal may be transmitted as one or more candidates, wherein the one or more candidates are to be searched for detection of the wake-up signal by the one or more communication devices.

Paragraph 36. Circuitry for a communications device forming part of a wireless communications system comprising an infrastructure equipment and the communications device, wherein the communications device comprises transceiver circuitry and controller circuitry which are configured in combination
to receive a candidate indicator message from the infrastructure equipment in advance of a portion of radio resources defining a search space in which the communications device is operable to search for a wake-up signal transmitted by the infrastructure equipment,
wherein the wake-up signal is for providing an indication to the communications device that it should receive a paging message in one or more of a plurality of temporally spaced paging occasions, and
wherein the candidate indicator message indicates one or more characteristics of the wake-up signal by which the wake-up signal may be transmitted as one or more candidates, wherein the one or more candidates are to be searched for detection of the wake-up signal by the one or more communication devices.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] White Paper "Coverage Analysis of LTE-M Category-M1" Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2016.
[7] R1-1716995, "Reduced System Acquisition Time for MTC," Ericsson 3GPP TSG-RAN WG1 Meeting #90bis, Prague, Czech Republic, Oct. 9-13, 2017.
[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.
[9] European patent application no. EP17186065.
[10] R1-1719351, "Downlink Channel Power Efficiency for MTC," Ericsson, RAN1 #91.
[11] R1-1714992, "Assumptions for eMTC Power Consumption for Power Saving Signal/Channel," Ericsson, RAN1 #90.
[12] European patent application no. EP17193861.
[13] R1-1708311, "Idle Mode Power Efficiency Reduction," Sierra Wireless, RAN1 #89.
[14] European patent application no. EP17169821.
[15] European patent application no. EP17201748.
[16] European patent application no. EP17202451.

What is claimed is:
1. A method of operating an infrastructure equipment, the method comprising:

providing a wireless access interface for communication between the infrastructure equipment and a plurality of communications devices;

allocating a portion of radio resources of the wireless access interface as a search space for a communications device of the plurality of communications devices to search for a wake-up signal transmitted by the infrastructure equipment, the wake-up signal providing an indication to one or more communications devices of the plurality of communications devices to receive a paging message in one or more of a plurality of temporally spaced paging occasions; and transmitting, prior to an occasion of the radio resources as the search space, a candidate indicator message to the one or more communications devices, the candidate indicator message indicating one or more repetition levels of the wake-up signal by which the wake-up signal may be transmitted, wherein a plurality of candidate radio resources in the search space are searchable, to detect the wake-up signal, by the one or more communications devices, the candidate indicator message indicates a plurality of values, each value of the plurality of values corresponding to a different subset of candidate radio resources of the plurality of candidate radio resources selected for repeated transmission of the wake-up signal, the one or more repetition levels are of a plurality of repetition levels, each repetition level of the plurality of repetition levels defines a number of times N which the wake-up signal can be transmitted, the number N being an integer including one to a maximum number Nmax, and a number of repetitions of the plurality of repetition levels is periodically set to be the maximum number Nmax.

2. The method according to claim 1, further comprising:
determining that a paging message should be transmitted to one or more of the communications devices in one or more of the plurality of temporally spaced paging occasions following the search space;

in a case that the determining indicates that the paging message should be transmitted to one or more communications device of the plurality of communications devices, transmitting the wake-up signal in the search space in accordance with the repetition level indicated in the candidate indicator message; and transmitting the paging message in one or more of the plurality of temporally spaced paging occasions following the search space.

3. The method according to claim 2, wherein
the portion of radio resources defining the search space is arranged within a search space grid of radio resources extending in frequency and time, and the extension in frequency is sufficient to span a range of frequencies over which the wake-up signal may be transmitted and the extension in time is sufficient to span a transmission of the wake-up signal at the maximum number Nmax.

4. The method according to claim 1, wherein the candidate indicator message includes part of a synchronization signal transmitted by the infrastructure equipment to a communications device of the plurality of communications devices, the synchronization signal being used by the communications device to re-synchronize its timing with the infrastructure equipment.

5. The method according to claim 4, wherein the synchronization signal is one of a go-to-sleep or wake-up signal, GUS, or a machine type communication synchronization signal, MSS.

6. The method according to claim 1, wherein the candidate indicator message is transmitted periodically and in radio resources configured via one of unicast radio resource control, RRC, signalling or a system information block, SIB, broadcast by the infrastructure equipment.

7. The method according to claim 2, wherein the candidate indicator message is transmitted by the infrastructure equipment in a case that the infrastructure equipment determines that the repetition level with which the wake-up signal is to be transmitted is different to the maximum number Nmax.

8. The method according to claim 2, wherein the candidate indicator message is transmitted by the infrastructure equipment in a case that the infrastructure equipment determines that the repetition level with which the wake-up signal is to be transmitted is smaller or larger than the repetition level selected for a previous search space indicated by a previous candidate indicator message.

9. The method according to claim 1, wherein the candidate indicator message comprises part of a downlink control information, DCI, transmission by the infrastructure equipment.

10. The method according to claim 1, further comprising:
transmitting, to a communications device of the plurality of communications devices, an indication of one or more locations within the wireless access interface that the communications device should monitor for the candidate indicator message.

11. The method according to claim 1, further comprising:
transmitting the candidate indicator message in a first frequency band during a first transmission period; and
transmitting the candidate indicator message in a second frequency band during a second transmission period, wherein
the first frequency band and the second frequency band are separated in frequency and the first transmission period and the second transmission period at least partially overlap in time.

12. The method according to claim 1, wherein the plurality of values are based on a Zadoff Chu sequence.

13. The method according to claim 12, wherein
the Zadoff Chu sequence comprises a plurality of roots, and
each root of the plurality of roots is used to indicate a different subset of candidate radio resources selected for the repeated transmission of the wake-up signal.

14. The method according to claim 1, wherein the plurality of values are based on a Gold sequence.

15. The method according to claim 14, wherein a different denomination of a characteristic of the Gold sequence is used to indicate a different subset of candidate radio resources selected for the repeated transmission of the wake-up signal.

16. The method according to claim 1, wherein the candidate indicator message comprises a candidate reset, the candidate reset indicating to a communications device of the plurality of communications devices that the communications device should search for the wake-up signal in the search space for candidates according to all of the repetition levels of the plurality of repetition levels.

17. The method according to claim 1, wherein the candidate indicator message indicates to a communications device of the plurality of communications devices that the communications device should not search for candidates of the wake-up signal in the search space according to the repetition level.

18. An infrastructure equipment, comprising:
transceiver circuitry; and
controller circuitry configured in combination with the transceiver circuitry to
provide a wireless access interface for communication between the infrastructure equipment and a plurality of communications devices;
allocate a portion of radio resources of the wireless access interface as a search space for a communications device of the plurality of communications devices to search for a wake-up signal transmitted by the infrastructure equipment, the wake-up signal providing an indication to one or more communications devices of the plurality of communications devices to receive a paging message in one or more of a plurality of temporally spaced paging occasions; and
transmit, prior to an occasion of the radio resources as the search space, a candidate indicator message to the one or more communications devices, the candidate indicator message indicating one or more repetition levels of the wake-up signal by which the wake-up signal may be transmitted, wherein
a plurality of candidate radio resources are searchable, to detect the wake-up signal, by the one or more communications devices,
the candidate indicator message indicates a plurality of values, each value of the plurality of values corresponding to a different subset of candidate radio resources of the plurality of candidate radio resources selected for repeated transmission of the wake-up signal,
the one or more repetition levels are of a plurality of repetition levels,
each repetition level of the plurality of repetition levels defines a number of times N which the wake-up signal can be transmitted, the number N being an integer including one to a maximum number Nmax, and
a number of repetitions of the plurality of repetition levels is periodically set to be the maximum number Nmax.

19. A communications device, comprising:
transceiver circuitry; and
controller circuitry in combination with the transceiver circuitry to
receive a candidate indicator message from an infrastructure equipment; and
in response to reception of the candidate indicator message, search a search space of radio resources to detect a wake-up signal transmitted by the infrastructure equipment, wherein
the wake-up signal provides an indication to the communications device to receive a paging message in one or more of a plurality of temporally spaced paging occasions,
the candidate indicator message indicates one or more repetition levels of the wake-up signal by which the wake-up signal may be transmitted, the one or more repetition levels being of a plurality of repetition levels,
the candidate indicator message indicates a plurality of values, each value of the plurality of values corresponding to a different subset of candidate radio resources of a plurality of candidate radio resources selected for repeated transmission of the wake-up signal, and
the candidate indicator message comprises a candidate reset which indicates that the communications device should search for the wake-up signal in the search space for candidates according to all of the plurality of repetition levels.

* * * * *